United States Patent
Lee et al.

(10) Patent No.: US 12,279,732 B2
(45) Date of Patent: Apr. 22, 2025

(54) ROBOT CLEANER AND CONTROL METHOD THEREOF

(71) Applicant: LG ELECTRONICS INC., Seoul (KR)

(72) Inventors: Youngsub Lee, Seoul (KR); Hwan Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 17/797,273

(22) PCT Filed: Aug. 13, 2020

(86) PCT No.: PCT/KR2020/010710
§ 371 (c)(1),
(2) Date: Aug. 3, 2022

(87) PCT Pub. No.: WO2021/157799
PCT Pub. Date: Aug. 12, 2021

(65) Prior Publication Data
US 2023/0058513 A1 Feb. 23, 2023

(30) Foreign Application Priority Data
Feb. 6, 2020 (KR) .......................... 10-2020-0014470

(51) Int. Cl.
*A47L 11/40* (2006.01)
*A47L 11/282* (2006.01)
*G05D 1/00* (2024.01)

(52) U.S. Cl.
CPC ......... *A47L 11/4011* (2013.01); *A47L 11/282* (2013.01); *A47L 11/4005* (2013.01);
(Continued)

(58) Field of Classification Search
CPC .................. A47L 11/4011; A47L 11/282; A47L 11/4005; A47L 11/4038; A47L 11/4066;
(Continued)

(56) References Cited

U.S. PATENT DOCUMENTS

2005/0171644 A1* 8/2005 Tani .................. G05D 1/0259
701/25
2009/0281661 A1* 11/2009 Dooley .............. B60L 15/2036
901/1
(Continued)

FOREIGN PATENT DOCUMENTS

EP 3 440 980 2/2019
EP 3 501 364 6/2019
(Continued)

OTHER PUBLICATIONS

International Search Report dated Dec. 23, 2020 issued in Application No. PCT/KR2020/010710.
Korean Office Action dated Dec. 14, 2020 issued in Application No. 10-2020-0014470.
Korean Notice of Allowance dated Jun. 22, 2021 issued in Application No. 10-2020-0014470.
European Search Report issued in Application No. 20917972.0 dated Feb. 15, 2024.

*Primary Examiner* — Sihar A Karwan
(74) *Attorney, Agent, or Firm* — KED & ASSOCIATES, LLP

(57) ABSTRACT

A robot cleaner and a control method thereof are disclosed. A robot cleaner, according to an embodiment of the present invention, comprises: a tilt sensor module; a distance sensor module; and a light amount sensor module. Each piece of sensed information is transmitted to a lifting information calculation module. The lifting information calculation module calculates information on whether the robot cleaner is lifted, by using each piece of the transmitted information. If it is calculated that the robot cleaner is lifted off a floor, a power module is stopped. In addition, if it is calculated that the robot cleaner is not lifted off the floor, the power module is driven. Accordingly, when a user lifts the robot cleaner, (Continued)

injuries to the user caused by operation of a drive module can be prevented.

13 Claims, 21 Drawing Sheets

(52) U.S. Cl.
CPC ....... *A47L 11/4038* (2013.01); *A47L 11/4066* (2013.01); *A47L 11/4069* (2013.01); *G05D 1/0238* (2013.01); *A47L 2201/04* (2013.01); *A47L 2201/06* (2013.01)

(58) Field of Classification Search
CPC .............. A47L 11/4069; A47L 2201/04; A47L 2201/06; A47L 11/4072; A47L 11/4061; A47L 9/2889; G05D 1/0238; B25J 11/0085; B25J 19/02; B25J 19/021; B25J 19/06
See application file for complete search history.

(56) References Cited

U.S. PATENT DOCUMENTS

| | | |
|---|---|---|
| 2018/0368642 A1 | 12/2018 | Son et al. |
| 2019/0200823 A1 | 7/2019 | Song et al. |

FOREIGN PATENT DOCUMENTS

| | | | | |
|---|---|---|---|---|
| KR | 10-0657530 | 12/2006 | | |
| KR | 10-1602790 | 3/2016 | | |
| KR | 10-2016-0048492 | 5/2016 | | |
| KR | 2018-0025724 A | * 9/2016 | .............. | B25J 11/00 |
| KR | 10-2018-0025724 | 3/2018 | | |
| KR | 10-2019-0007905 | 1/2019 | | |
| KR | 10-1918228 | 1/2019 | | |
| KR | 10-2023966 | 9/2019 | | |

* cited by examiner

ROBOT CLEANER AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2020/010710, filed Aug. 13, 2020, which claims priority to Korean Patent Application No. 10-2020-0014470, filed Feb. 6, 2020, whose entire disclosures are hereby incorporated by reference.

TECHNICAL FIELD

The present disclosure relates to a robot cleaner, and more particularly, to a robot cleaner having a structure capable of detecting whether the robot cleaner is lifted, and a control method thereof.

BACKGROUND ART

A robot cleaner is a device that cleans a floor on which the robot cleaner drives while driving by itself. Some of robot cleaners in the related art are provided with a mop for wiping a floor surface with a damp cloth on which the robot cleaner drives.

A user may input control information on a desired driving pattern, time, and the like in advance, and the robot cleaner is operated according to the input control information.

Furthermore, as is well known, the robot cleaner may drive in one direction when a mop is rotated on the floor surface according to a preset pattern. That is, the driving of the robot cleaner and the cleaning of the floor surface may be performed by a unified operation. A driving method of a robot cleaner by the rotation of a mop is disclosed in Korean Patent Registration No. 10-1602790.

In a case where the user lifts the robot cleaner from the floor surface, when the mop continues to rotate, an injury to the user may occur. For example, the user's finger may be sucked between the rotating mops, thereby causing an injury to the user.

In consideration of this point, when the robot cleaner is lifted from the floor surface, it is preferable that the rotation of the mop is stopped.

Prior Art Document (Korean Patent Registration No. 10-0657530) discloses an autonomous driving robot having a structure capable of detecting whether the robot is lifted. Specifically, when a spring is connected to a wheel and the robot is spaced apart from the floor surface, the spring moves a mechanical switch away from a detection part to determine whether the robot is lifted.

However, since a separate wheel rotated by a power module is not provided in a structure in which driving and cleaning are simultaneously performed by the rotation of the mop, detecting whether the wheel is lifted by a wheel structure to which the spring of the Prior Art Document is connected is limited.

Furthermore, the autonomous driving robot disclosed in the Prior Art Document is provided with a cliff sensor, and the cliff sensor detects a distance from the floor surface to determine whether the robot is lifted.

However, the robot cleaner driven by the rotation of the mop may be shaken at the time of starting or stopping to increase a distance detected by the cliff sensor. Accordingly, a problem of being erroneously determined on whether the robot cleaner is lifted during normal cleaning may occur. In addition, even when foreign matter of a predetermined size is put in between the mop and the floor surface such that the robot cleaner is shaken, a problem of being erroneously determined on whether the robot cleaner is lifted may occur.

Korean Patent Registration No. 10-0657530 (Dec. 14, 2006)

DISCLOSURE OF INVENTION

Technical Problem

An object of the present disclosure is to provide a robot cleaner having a structure capable of solving the foregoing problems, a robot cleaner including the same, and a control method thereof.

First, an aspect of the present disclosure is to provide a robot cleaner having a structure capable of effectively detecting whether the robot cleaner is lifted from a floor surface while driving, and a control method thereof.

Another aspect of the present disclosure is to provide a robot cleaner having a structure capable of improving the accuracy of determining whether the robot cleaner is lifted from the floor surface, and a control method thereof.

Still another aspect of the present disclosure is to provide a robot cleaner having a structure capable of suppressing an injury to a user by stopping an operation of the robot cleaner when the robot cleaner is lifted from the floor surface, and a control method thereof.

Solution to Problem

In order to achieve the objectives, the present disclosure provides a robot cleaner including a body part to which a spin mop is rotatably coupled; a power module connected to the spin mop, and rotated according to operation information to rotate the spin mop; a sensor part provided in the body part, and configured to detect information on the driving of the body part; and a controller configured to calculate the operation information, electrically connected to the power module to transmit the calculated operation information, and electrically connected to the sensor part to receive the information on the driving of the body part.

Furthermore, the sensor part may include a tilt sensor module configured to detect the tilt information of the body part; a distance sensor module configured to detect distance information from a floor surface on which the body part drives; and a light amount sensor module configured to detect light amount information reflected from the floor surface.

Furthermore, the controller may calculate the operation information using at least one of the tilt information, the distance information, and the light amount information.

Furthermore, the distance sensor module and the light amount sensor module are provided on one side surface of the body part facing the floor surface, and the spin mop may include a first spin mop and a second spin mop spaced apart from each other on the one side surface of the body part.

Furthermore, the distance sensor module and the light amount sensor module may be disposed with an imaginary line extending through each center point of the first spin mop and the second spin mop therebetween.

Furthermore, the one side surface of the body part may be defined in a circular shape.

Furthermore, the controller may calculate lift information on whether the body part is lifted from the floor surface using at least one of the tilt information, the distance information, and the light amount information.

Furthermore, the controller may calculate the operation information using the lift information.

Furthermore, the power module may include a first power module connected to the first spin mop; and a second power module connected to the second spin mop.

Furthermore, the operation information may include driving information that rotates or stops the first spin mop and the second spin mop.

Furthermore, the controller may calculate the operation information using at least one of the tilt information, the distance information, and the light amount information.

In addition, the present disclosure provides a method of controlling a robot cleaner, and the method may include (a) detecting, by a sensor part, information on an operating state of the robot cleaner; (b) calculating, by a lift information calculation module, lift information on whether the robot cleaner is lifted from a floor surface using the detected information; (c) calculating, by an operation information calculation module, operation information using the calculated lift information; and (d) controlling a power module according to the calculated operation information.

Furthermore, the step (a) of the control method of the robot cleaner may include (a1) detecting, by a tilt sensor module, first tilt information and second tilt information of the robot cleaner; (a2) detecting, by a distance sensor module, distance information on a distance to the floor surface; and (a3) detecting, by a light amount sensor module, light amount information on an amount of light reflected from the floor surface.

Furthermore, the first tilt information may be information on an angle at which the robot cleaner is rotated with respect to a preset first axis, and the second tilt information may be information on an angle at which the robot cleaner is rotated with respect to a second axis intersecting the first axis.

Furthermore, the step (b) of the control method of the robot cleaner may include (b11) comparing, by a tilt information calculation unit, the first tilt information with a preset first reference tilt value; and (b12) calculating, by the tilt information calculation unit, first temporary lift information when the first tilt information is above the first reference tilt value.

Furthermore, subsequent to the step (b11) of the control method of the robot cleaner, the step (b) may include (b13) comparing, by the tilt information calculation unit, the second tilt information with a preset second reference tilt value when the first tilt information is less than the first reference tilt value; and (b14) calculating, by the tilt information calculation unit, the first temporary lift information when the second tilt information is above the second reference tilt value.

Furthermore, the distance sensor module may be provided in plurality, and the plurality of distance sensor modules may be configured to detect distance information, respectively.

Furthermore, subsequent to the step (b13), the step (b) of the control method of the robot cleaner may include (b15) comparing, by a distance information calculation unit, a number of the distance information above a preset reference distance value from among the plurality of distance information with a preset reference number when the second tilt information is less than the second reference tilt value; and (b16) calculating, by the distance information calculation unit, second temporary lift information when the number of the distance information above the reference distance value from among the plurality of distance information is less than the reference number.

Furthermore, subsequent to the step (b15), the step (b) of the control method of the robot cleaner may include (b17) comparing, by a light amount information calculation unit, the light amount information with a preset reference light amount value when the number of the distance information above the reference distance value from among the plurality of distance information is above the reference number; (b18) calculating, by the light amount information calculation unit, the first temporary lift information when the light amount information is below the reference light amount value; and (b19) calculating, by the light amount information calculation unit, the second temporary lift information when the light amount information exceeds the reference light amount value.

Furthermore, the step (b) of the control method of the robot cleaner may include (b21) comparing, by a time information calculation unit, a time for which the first temporary lift information is maintained with a preset first time when the first temporary lift information is calculated; (b22) calculating, by the time information calculation unit, the lift information such that the robot cleaner is lifted from the floor surface when the time for which the first temporary lift information is maintained is above the first time; and (b23) calculating, by the time information calculation unit, the lift information such that the robot cleaner is not lifted from the floor surface when the time for which the first temporary lift information is maintained is less than the first time.

Furthermore, the step (b) of the control method of the robot cleaner may include (b24) comparing, by a time information calculation unit, a time for which the second temporary lift information is maintained with a preset second time when the second temporary lift information is calculated; (b25) calculating, by the time information calculation unit, the lift information such that the robot cleaner is not lifted from the floor surface when the time for which the second temporary lift information is maintained is above the second time; and (b26) calculating, by the time information calculation unit, the lift information such that the robot cleaner is lifted from the floor surface when the time for which the second temporary lift information is maintained is less than the second time.

Furthermore, the step (c) of the control method of the robot cleaner may include (c1) calculating, by a driving information calculation unit, driving information as driving the power module using the lift information calculated such that the robot cleaner is not lifted from the floor surface; and (c2) calculating, by a driving information calculation unit, driving information as stopping the power module using the lift information calculated such that the robot cleaner is lifted from the floor surface.

Furthermore, the step (d) of the control method of the robot cleaner may include (d1) rotating, by a power module control unit, the power module according to the driving information calculated as driving the power module; and (d2) stopping, by the power module control unit, the power module according to the driving information calculated as stopping the power module.

Advantageous Effects of Invention

According to the present disclosure, the following effects can be derived.

First, a robot cleaner detects tilt information, distance information from a floor surface, and light amount information reflected from the floor surface of the robot cleaner.

The controller calculates information on whether the robot cleaner is lifted from a floor using the detected tilt information.

When it is determined by the tilt information that the robot cleaner is not lifted from the floor, the controller calculates information on whether the robot cleaner is lifted from the floor using the detected distance information and the amount of light.

As a result, the accuracy of determining whether the robot cleaner is lifted from the floor may be increased.

That is, even in a case where a user lifts the robot cleaner with one hand and a case where the user lifts the robot cleaner with both hands, the accuracy of determining whether the robot cleaner is lifted from the floor may be increased.

Furthermore, distance information is provided in plurality, and the robot cleaner determines that the robot cleaner moves away from the floor surface when some distance information from among the plurality of distance information is above a reference distance value. Accordingly, even when the user covers some of the plurality of distance sensor modules with his or her hand, it may be determined whether the robot cleaner moves away from the floor surface.

In addition, it is determined whether a front side of the robot cleaner moves away from the floor surface by the distance information, and it is determined whether a rear side of the robot cleaner moves away from the floor surface by the light amount information.

Accordingly, the robot cleaner may be suppressed from being erroneously determined to be lifted from the floor surface.

When the robot cleaner is lifted from the floor surface, the driving of a power module may be stopped by the controller, thereby suppressing an injury to the user by a driving module.

MODE FOR THE INVENTION

Hereinafter, a robot cleaner according to an embodiment of the present disclosure will be described in detail with reference to the accompanying drawings.

In the following description, the description of some components may be omitted to clarify the features of the present disclosure.

1. Definition of Terms

The term "floor surface" used below is a surface on which a robot cleaner 10 drives, and refers to a surface cleaned by a mop of the robot cleaner 10.

The term "cleaning" used below denotes that the robot cleaner 10 wipes a floor surface with a damp cloth.

The term "moving forward" used below refers to an operation in which the robot cleaner 10 moves in a specific direction to perform a task.

The term "moving backward" used below refers to an operation in which the robot cleaner 10 moves in a direction opposite to the specific direction to perform a task.

The term "electrically connected" used below denotes that one component is electrically connected to another component or is connected to enable information communication.

The electrical connection may be formed by a conductive wire, a communication cable, wireless communication, or the like.

The term "obstacle" used below refers to an object that is located on a driving path of the robot cleaner 10 when the robot cleaner 10 moves forward to obstruct the movement of the robot cleaner 10. For example, a threshold, a carpet, or the like may correspond to an obstacle.

Figure 1:
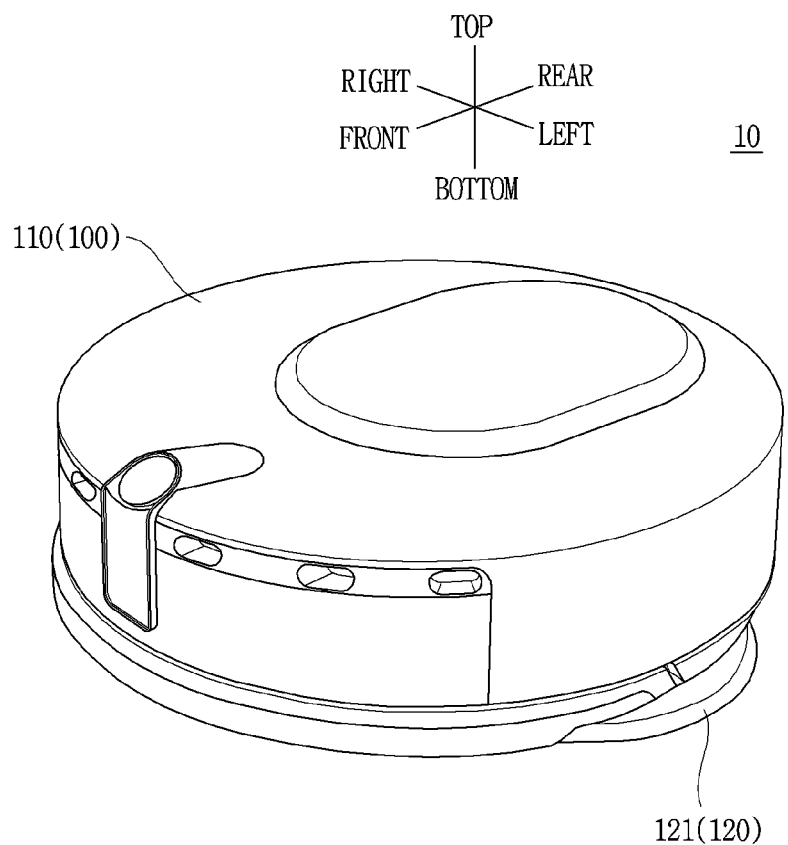
FIG. 1 is a perspective view of a robot cleaner according to an embodiment of the present disclosure.

The terms "front side", "rear side", "left side", "right side", "upper side" and "lower side" used below will be understood with reference to a coordinate system shown in FIG. 1.

2. Description of Configuration of Robot Cleaner 10 According to Embodiment of Present Disclosure Referring to FIGS. 1 to 3, the robot cleaner 10 according to an embodiment of the present disclosure includes a body part 100, a sensor part 200, a controller 300, and a database part 400.

(1) Description of Body Part 100

The body part 100 defines a body of the robot cleaner 10. The body part 100 includes a housing 110, a driving module 120, and a power module 130.

The housing 110 defines an outer side of the body part 100.

The housing 110 is preferably formed of a lightweight and highly durable material. In one embodiment, the housing 110 may be formed of a synthetic resin such as reinforced plastic.

In one embodiment, an outer surface of the housing 110 may be defined in a circular shape. Through this, when a direction of the robot cleaner 10 is changed, an outer surface of the housing 110 may be suppressed from being caught by an obstacle 1 (refer to FIG. 24).

A part of the sensor part 200 may be provided on one side of the housing 110 facing a floor surface.

A predetermined space is defined inside the housing 110. In the space, a portion of the sensor part 200, the controller 300, and the database part 400 may be provided.

The driving module 120 is provided on one side of the housing 110 facing the floor surface.

The driving module 120 functions as an element by which the robot cleaner 10 can be moved. The driving module 120 is connected to the power module 130.

A driving force generated by the power module 130 may be transmitted to the driving module 120 to move the robot cleaner 10 to the front or the rear.

In addition, a plurality of power modules 130 may be provided to be independently driven. Accordingly, the driving module 120 may be independently driven to change a direction in which the robot cleaner 10 is driven.

The driving module 120 includes a first mop 121 and a second mop 122. The first mop 121 is coupled to a first power module 131 to receive a driving force from the first power module 131. In addition, the second mop 122 is coupled to a second power module 132 to receive a driving force from the second power module 132.

In one embodiment, the first mop 121 and the second mop 122 may be defined in a circular shape that can be coupled to a rotation shaft to rotate.

The first mop 121 and the second mop 122 are provided on both sides of one side surface of the housing 110. In a shown embodiment, the one side may be defined as a lower side, and the both sides may be defined as left and right sides.

Figure 2:
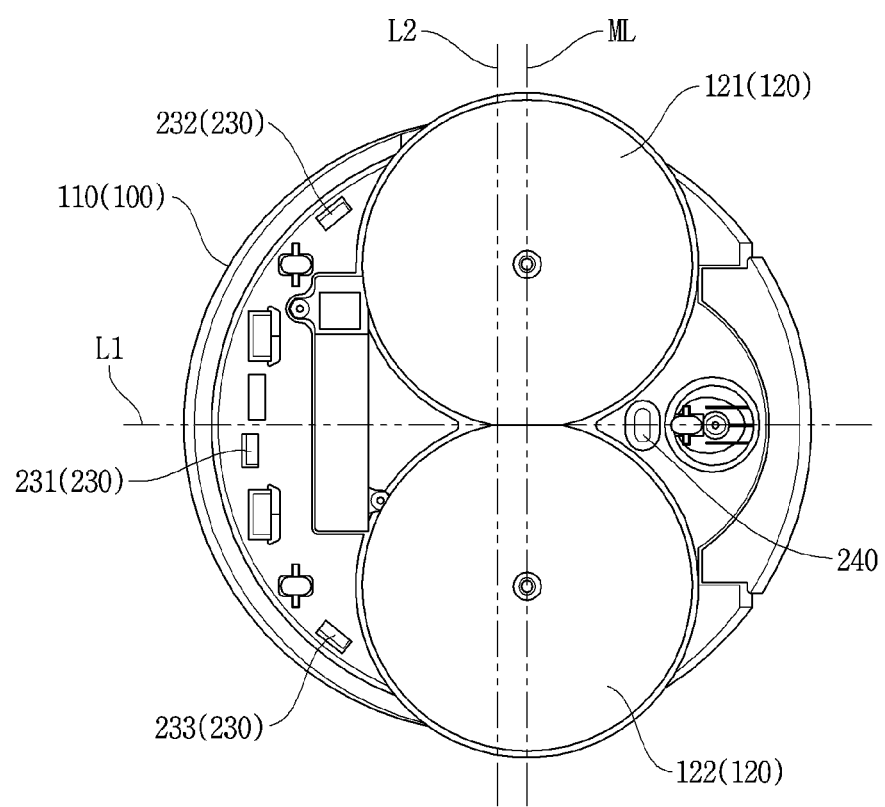
FIG. 2 is a bottom view showing one side of the robot cleaner according to FIG. 1.
Figure 3:
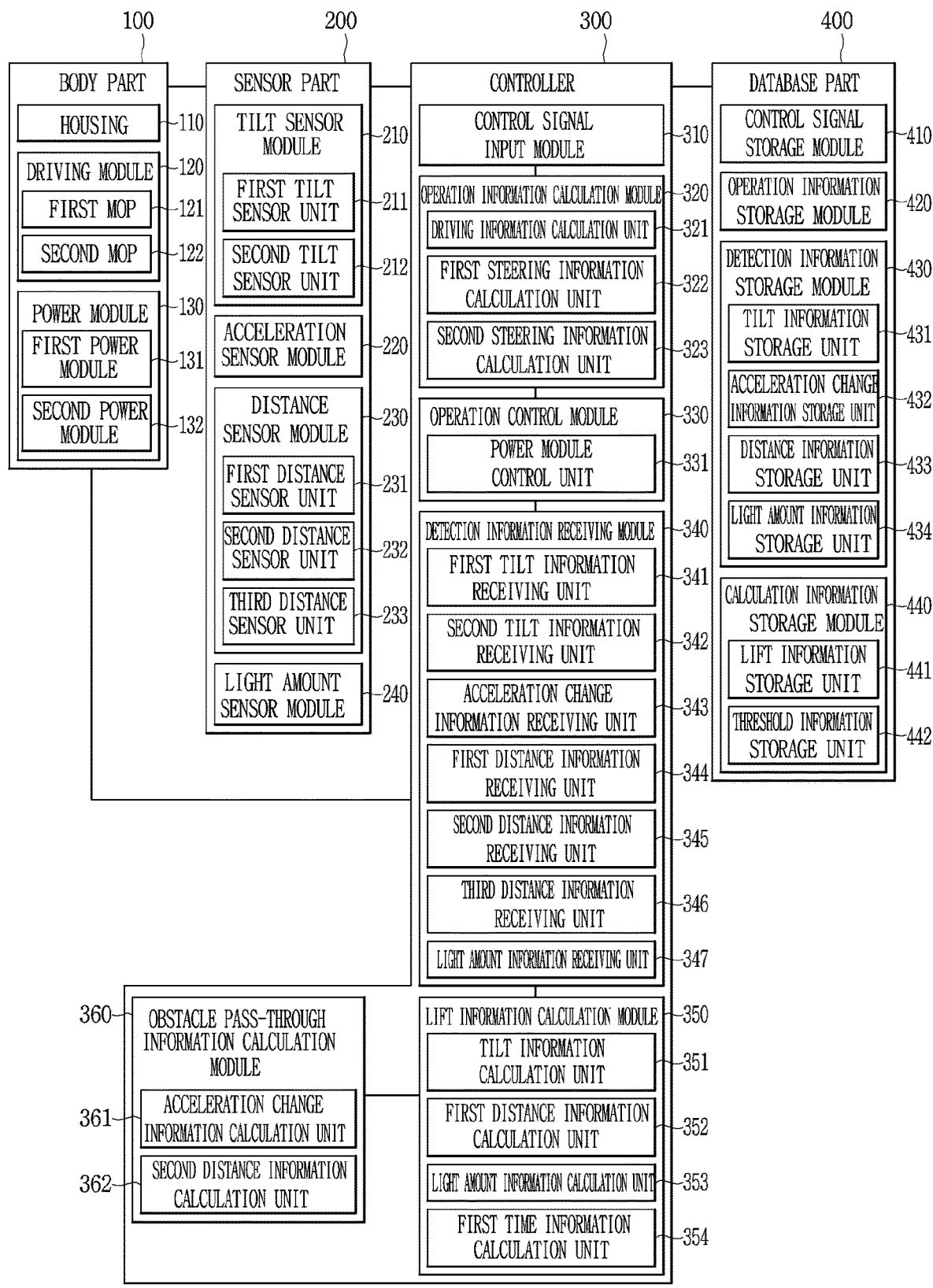
FIG. 3 is a block diagram showing a configuration of the robot cleaner according to FIG. 1.
Figure 4:
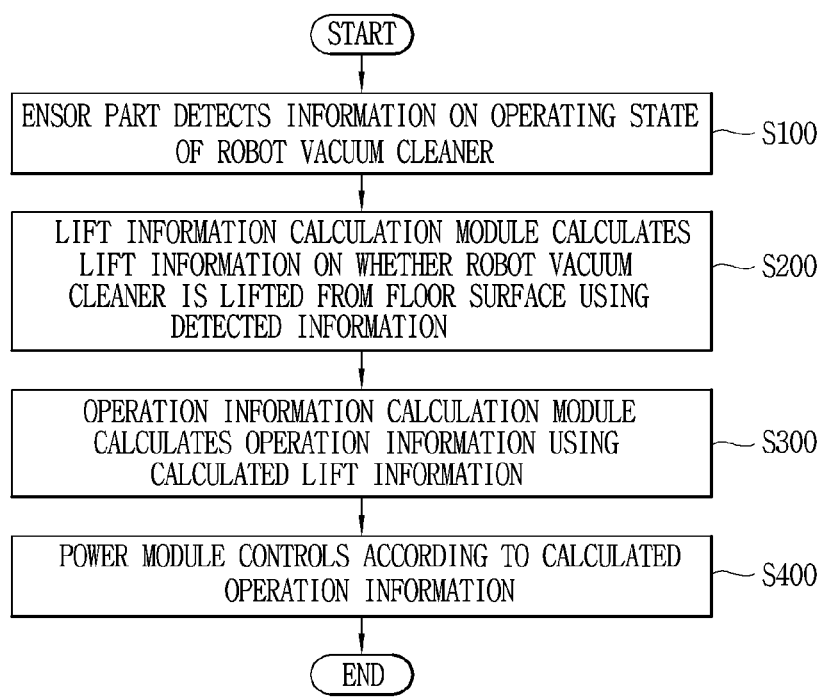
FIG. 4 is a flowchart showing a flow of a method of controlling a robot cleaner according to an embodiment of the present disclosure.
Figure 5:
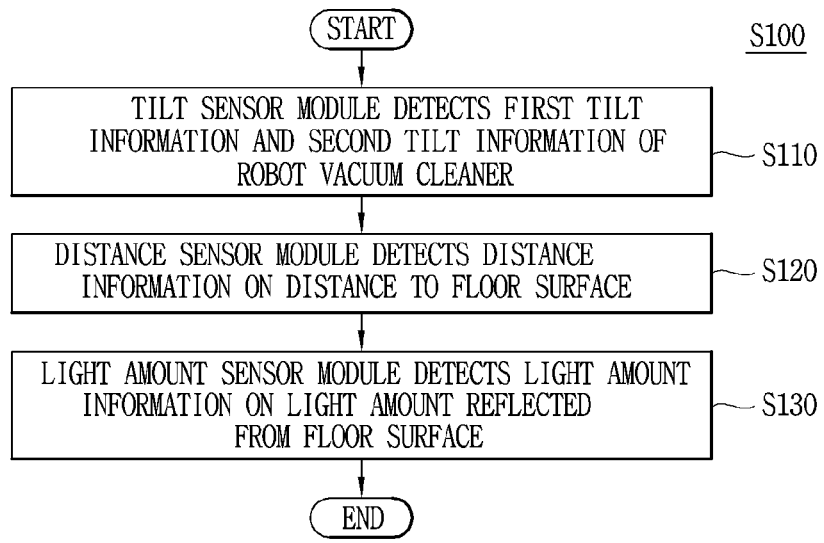
FIG. 5 is a flowchart showing a detailed flow of step S100 in FIG. 4.
Figure 6:
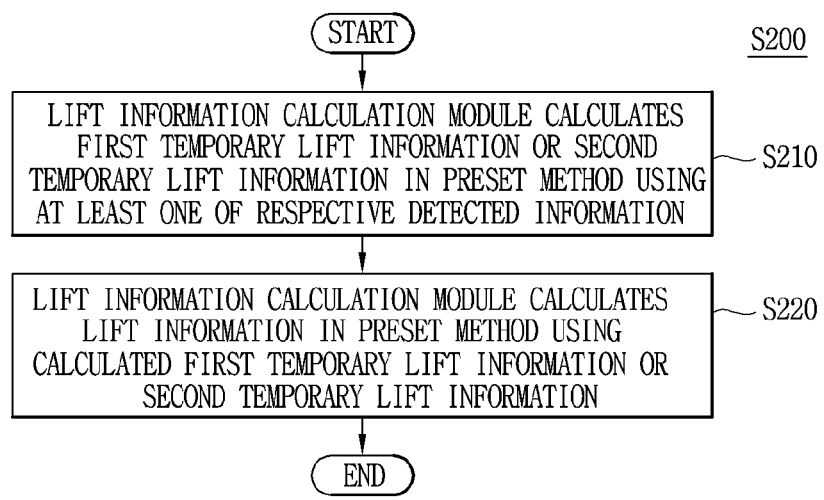
FIG. 6 is a flowchart showing a detailed flow of step S200 in FIG. 4.
Figure 7:
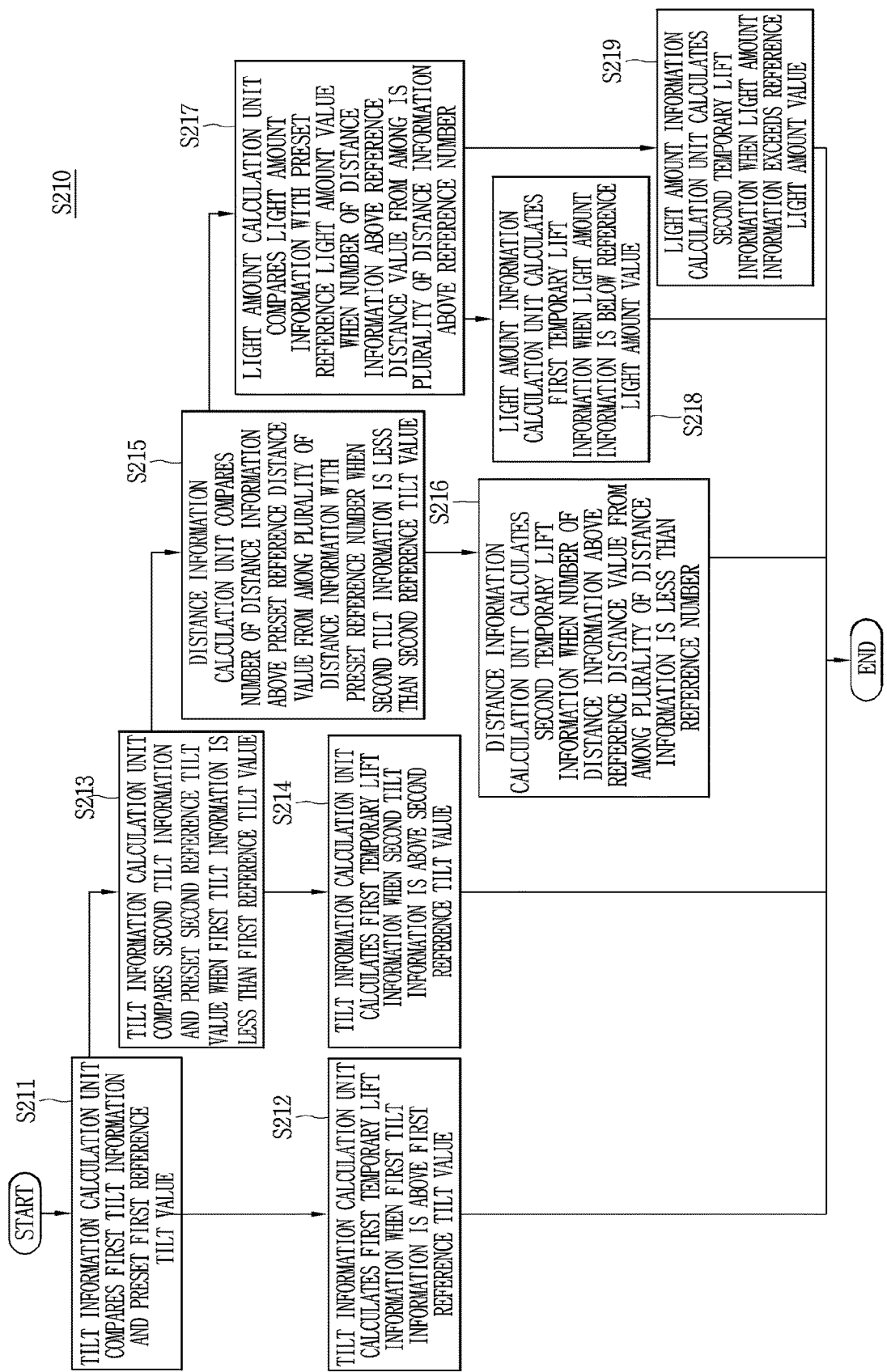
FIG. 7 is a flowchart showing a detailed flow of step S210 in FIG. 6.
Figure 8:
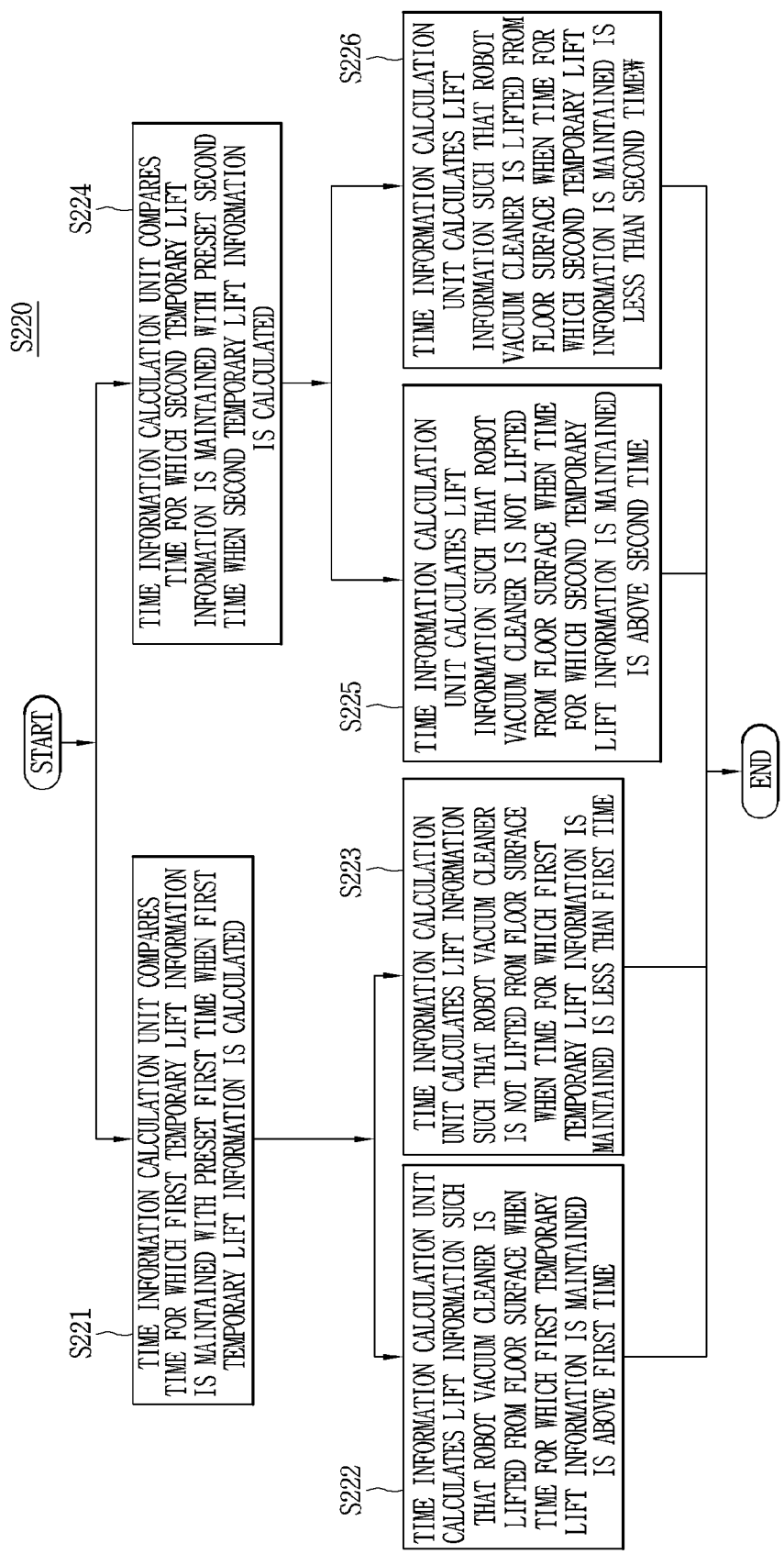
FIG. 8 is a flowchart showing a detailed flow of step S220 in FIG. 6.
Figure 9:
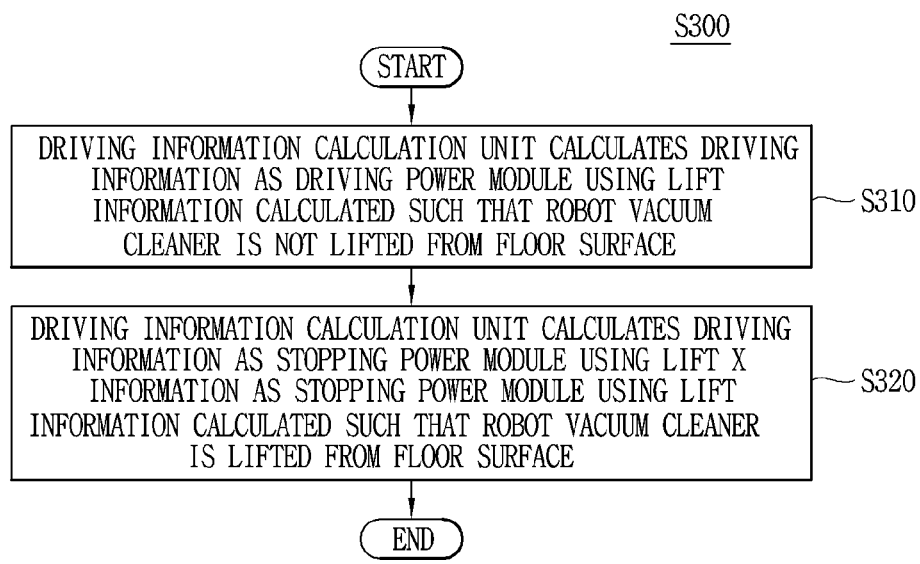
FIG. 9 is a flowchart showing a detailed flow of step S300 in FIG. 4.
Figure 10:
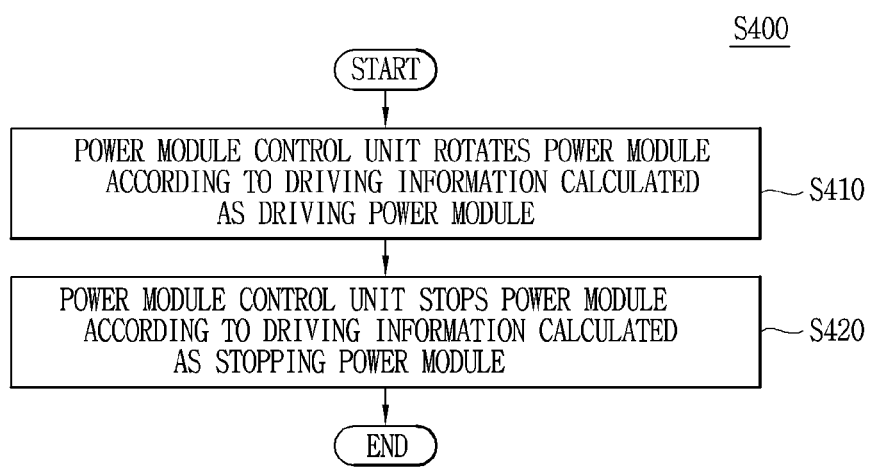
FIG. 10 is a flowchart showing a detailed flow of step S400 in FIG. 4.

Referring to FIG. 2, a first imaginary line L1 extending along a forward direction of the robot cleaner 10 to bisect the robot cleaner 10 is shown, and a second imaginary line L2 intersecting the first imaginary line L1 to bisect the robot cleaner 10 is shown.

A first tilt and a second tilt to be described later may be determined based on the first imaginary line L1 and the second imaginary line L2, respectively.

In one embodiment, a mop imaginary line ML passing through the centers of the first and second mops 121, 122 may be located on a rear side of the second imaginary line L2.

In one embodiment, each center of the first mop 121 and the second mop 122 may be located on a rear side of the second imaginary line L2.

In one embodiment, the first mop 121 and the second mop 122 may be disposed on left and right sides of the first imaginary line L1, respectively.

The first mop 121 and the second mop 122 may be defined to be inclined at a predetermined angle with respect to the floor surface. In one embodiment, the first mop 121 may be inclined so that the left side is closer to the floor surface compared to the right side. In addition, the second mop 122 may be inclined so that the right side is closer to the floor surface compared to the left side.

Then, the left side of the first mop 121 and the right side of the second mop 122 may be mainly in contact with the floor surface. Thereby, when the first mop 121 and the second mop 122 are rotated, the left side of the first mop 121 and the right side of the second mop 122 push the floor surface to move the robot cleaner 10.

In one embodiment, as the first mop 121 rotates counterclockwise and the second mop 122 rotates clockwise, the robot cleaner 10 may move forward.

In one embodiment, as the first mop 121 rotates clockwise and the second mop 122 rotates counterclockwise, the robot cleaner 10 may move backward.

In one embodiment, as the first mop 121 rotates counterclockwise and the second mop 122 rotates counterclockwise, the robot cleaner 10 may rotate to the right.

In one embodiment, as the first mop 121 rotates clockwise and the second mop 122 rotates clockwise, the robot cleaner 10 may be rotated to the left.

The power module 130 generates a driving force for rotating the first mop 121 and the second mop 122. The power module 130 may be electrically connected to the controller 300 to receive operation information.

In one embodiment, the power module 130 may be provided with a motor. The power module 130 may be accommodated in an inner space of the housing 110.

The power module 130 may receive power from an outside. In one embodiment, the power module 130 may receive power by a battery (not shown) provided in the robot cleaner 10. The power module 130 may be electrically connected to the battery (not shown).

As described above, as the power module 130 rotates, the robot cleaner 10 may move forward or backward. Furthermore, as the power module 130 rotates, the robot cleaner 10 may rotate to the left or right.

The first power module 131 and the second power module 132 may be driven independently. That is, the respective rotation directions of the first power module 131 and the second power module 132 may be controlled independently of each other. To this end, the first power module 131 and the second power module 132 may be respectively electrically connected to the controller 300.

(2) Description of Sensor Part 200

The sensor part 200 detects information on the operating state of the robot cleaner 10. Furthermore, the sensor part 200 detects information on the driving of the robot cleaner 10. The information detected by the sensor part 200 is transmitted to the controller 300, and is used by the controller 300 to generate control information suitable for the situation.

The sensor part 200 may be provided in any form capable of detecting information on the operating state of the robot cleaner 10.

The sensor part 200 may be electrically connected to a battery (not shown). Power required for the operation of the sensor part 200 may be supplied from the battery (not shown) connected thereto.

The sensor part 200 includes a tilt sensor module 210, an acceleration sensor module 220, a distance sensor module 230, and a light amount sensor module 240.

The tilt sensor module 210 is configured to detect a tilt of the robot cleaner 10. In one embodiment, the tilt sensor module 210 may be configured to detect tilt information with respect to a reference line when the robot cleaner 10 is lifted from the floor surface.

In one embodiment, the tilt sensor module 210 may be provided as a gyro sensor or the like.

The tilt sensor module 210 includes a first tilt sensor unit 211 and a second tilt sensor unit 212.

The first tilt sensor unit 211 and the second tilt sensor unit 212 may be respectively configured to detect tilt information with respect to the reference line of the robot cleaner 10.

In one embodiment, the first tilt sensor unit 211 may be configured to measure an angle at which the robot cleaner 10 is tilted with respect to the first imaginary line L1. In one embodiment, the second tilt sensor unit 212 may be configured to measure an angle at which the robot cleaner 10 is tilted with respect to the second imaginary line L2.

The first tilt sensor unit 211 and the second tilt sensor unit 212 are electrically connected to a detection information receiving module 340 of the controller 300. The tilt information detected by the first tilt sensor unit 212 and the second tilt sensor unit 212 is transmitted to a first tilt information receiving unit 341 and a second tilt information receiving unit 342, respectively. The transmitted information may be used to calculate operation information.

In one embodiment, the tilt sensor module 210 is provided inside the housing 110. The provided tilt sensor module 210 detects tilt information of the robot cleaner 10 with respect to the reference line based on the provided position.

The acceleration sensor module 220 is configured to detect an acceleration change of the robot cleaner 10. That is, the acceleration sensor module 220 detects an acceleration change of the robot cleaner 10 that is generated while the robot cleaner 10 is driving.

The acceleration sensor module 220 may be provided in any form capable of detecting an acceleration change of the robot cleaner 10. In one embodiment, an integrated circuit piezoelectric (ICP) type sensor, a capacitance type sensor, a strain gauge type sensor, or the like may be used for the acceleration sensor module 220.

The acceleration sensor module 220 is electrically connected to the detection information receiving module 340 of the controller 300. Acceleration change information detected by the acceleration sensor module 220 may be transmitted to the acceleration change information receiving unit 343 and used to calculate operation information.

In one embodiment, the acceleration sensor module 220 is provided inside the housing 110. The provided acceleration sensor module 220 detects an amount of acceleration change of the robot cleaner 10.

In one embodiment, the tilt sensor module 210 and the acceleration sensor module 220 may be integrally formed.

The distance sensor module 230 is configured to detect a distance between one side surface of the robot cleaner 10 facing a floor surface and the floor surface. That is, the distance sensor module 230 is configured to detect distance information between the floor surface and the robot cleaner 10.

The distance sensor module 230 may be provided in any form capable of detecting a distance between any objects. In one embodiment, the distance sensor module 230 may be provided as an ultrasonic sensor, an infrared ray (IR) sensor, a light detection and ranging (LiDAR) sensor, a radio detecting and ranging (Radar) sensor, a camera (stereo camera), or the like.

In one embodiment, the distance sensor module 230 may be provided as a time-of-flight (TOF) type sensor or the like. When the time-of-flight (TOF) type sensor is used, a time for which light is reflected and returned may be measured to measure a distance (refer to FIG. 13).

The distance sensor module 230 is electrically connected to the detection information receiving module 340 of the controller 300. The distance information detected by the distance sensor module 230 may be transmitted to the distance information receiving units 344, 345, 346 to be utilized to calculate operation information.

In the shown embodiment, the distance sensor module 230 may be located on a front side of the robot cleaner 10. That is, the distance sensor module 230 may be located at a side on which the robot cleaner 10 moves forward.

In the shown embodiment, the distance sensor module 230 may include a first distance sensor part 231, a second distance sensor part 232, and a third distance sensor part 233.

In the shown embodiment, the first distance sensor part 231, the second distance sensor part 232, and the third distance sensor part 233 may be disposed along a circular arc on a front side of the housing 110.

In the shown embodiment, the first distance sensor part 231 is located on the front side of the housing 110, and the second distance sensor part 232 and the third distance sensor part 233 may be located on left and right sides of the first distance sensor unit 231, respectively.

This is in consideration of a direction in which the robot cleaner 10 may come into contact with the obstacle 1 in the process of moving forward. Accordingly, not only when the robot cleaner 10 comes into contact with the obstacle 1 from a front side, but also when the robot cleaner 10 comes into contact with the obstacle 1 between the front and the left side or between the front and the right side, distance Information can be detected.

The first distance sensor part 231, the second distance sensor part 232, and the third distance sensor part 233 may be located to be recessed by a predetermined depth from a lower surface of the housing 110.

Accordingly, in a stationary state of the robot cleaner 10, a preset reference distance value may be defined between the floor surface and each of the distance sensor units 231, 232, 233.

Figure 14:
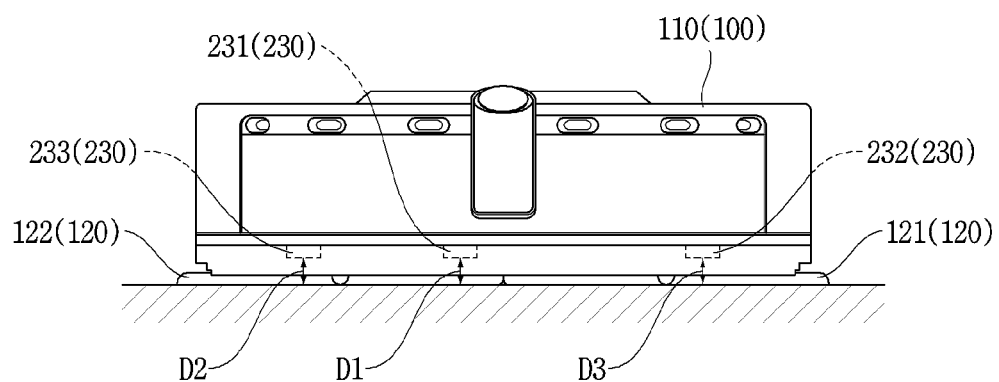
FIG. 14 is a front view showing the robot cleaner of FIG. 1.

Referring to FIG. 14, each of the distance sensor parts 231, 232, 233 is spaced apart from the floor surface by predetermined distances D1, D2, D3, respectively.

When each of the distance sensor parts 231, 232, 233 is lifted from the floor surface, distance information measured by each of the distance sensor parts 231, 232, 233 is detected to be above the reference distance value.

Figure 15:
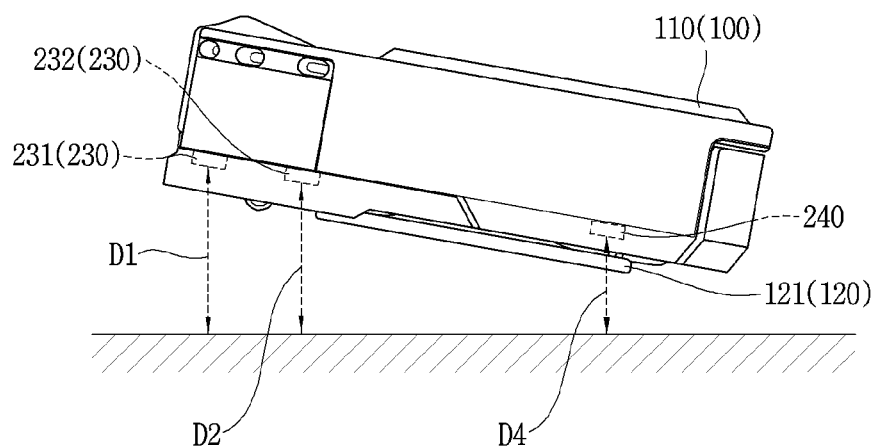
FIG. 15 is a side view showing a state in which the robot cleaner of FIG. 1 is lifted.

Referring to FIG. 15, as the robot cleaner 10 is lifted from the floor surface, the distances D1, D2, D3 between each of the distance sensor parts 231, 232, 233 and the floor surface increase to be greater than the reference distance value. Although not shown, the distance D3 between the third distance sensor part 233 and the floor surface is the same as the distance D2 between the second distance sensor part 232 and the floor surface.

Furthermore, when foreign matter is introduced between each of the distance sensor units 231, 232, 233 and the floor surface, or when the robot cleaner 10 climbs up the obstacle 1, distance information detected by each of the distance sensor units 231, 232, 233 may be detected to be below reference distance value (refer to FIGS. 25 and 26).

In an embodiment not shown, the distance sensor module 230 may include four or more distance sensor parts.

The light amount sensor module 240 is configured to detect light amount information on an amount of light reflected from the floor surface and entered into the light amount sensor module 240. In an embodiment not shown, a light unit (not shown) that emits light may be provided around the light amount sensor module 240.

Figure 13:
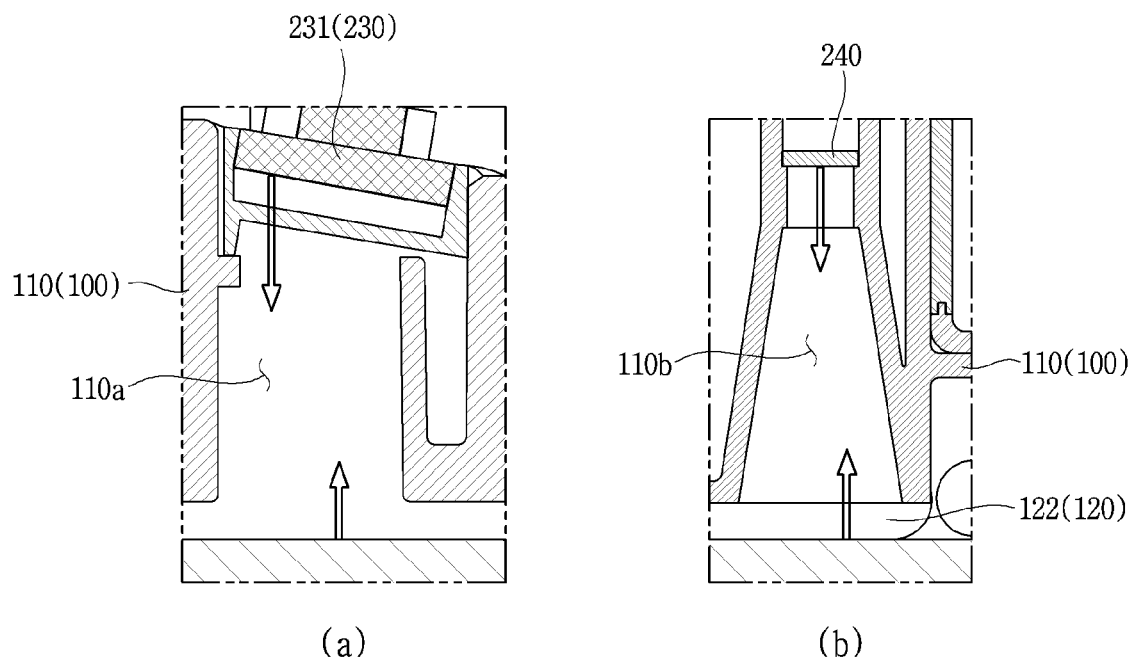
FIGS. 13(a) and (b) are cross-sectional views showing a distance sensor module and a light amount sensor module of the robot cleaner of FIG. 1.

The light amount sensor module 240 may be provided in any form capable of detecting an amount of light reflected from the floor surface (refer to FIG. 13).

The light amount sensor module 240 may be located to be recessed by a predetermined depth from a lower surface of the housing 110. Thereby, in a stationary state of the robot cleaner 10, the light amount sensor module 240 is located to be spaced apart from the floor surface by a predetermined distance.

When a distance between the light amount sensor module 240 and the floor surface increases, an amount of detected light decreases, and when a distance between the light amount sensor module 240 and the floor surface increases, an amount of detected light increases.

Referring to FIG. 15, as the robot cleaner 10 is lifted from the floor surface, a distance D4 between the light amount sensor module 240 and the floor surface increases, thereby decreasing an amount of light entered into the light amount sensor module 240.

In one embodiment, the light amount sensor module 240 may be provided as an optical flow sensor or the like.

The optical flow sensor is a sensor that detects image information related to the surroundings of the body while moving. A downward image input from an image sensor provided in the optical flow sensor is converted to generate image data in a predetermined format. Using the detected image data, the controller 300 may detect the position of the robot cleaner 10 regardless of the sliding of the robot cleaner 10.

In order for the optical flow sensor to detect image data, light reflected from the floor surface must be entered into the optical flow sensor, and thus, by using the amount of light that has entered, it may be possible to detect whether the optical flow sensor moves away from or approaches the floor surface.

That is, by using one optical flow sensor, it may be possible to detect not only image data of the floor surface but also proximity to or separation from the floor surface.

That is, it may be determined whether a rear side of the robot cleaner 10 is spaced apart from the floor surface without a separate distance sensor.

That is, the accuracy of determining whether the robot cleaner 10 is lifted may be improved without any additional configuration.

In the shown embodiment, the light amount sensor module 240 may be located on a rear side of the mop imaginary line ML. Accordingly, whether a front side of the robot cleaner 10 is spaced apart or close to the floor surface may be detected by the distance sensor module 230, and whether a rear side thereof is spaced apart from or proximate to the floor surface may be detected by the light amount sensor module 240.

In addition, as the light amount sensor module 240 is located on the rear side of the robot cleaner 10, the robot cleaner 10 may be suppressed from being erroneously determined to be lifted from the floor surface when the robot cleaner 10 is on a cliff.

Figure 16:
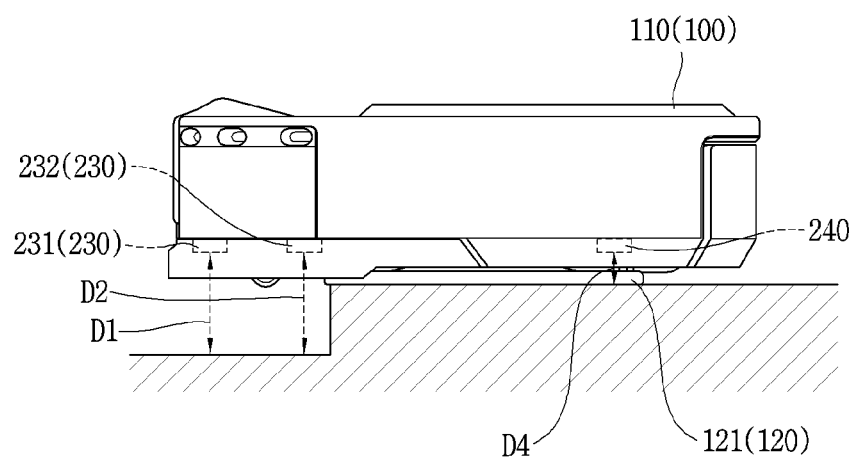
FIG. 16 is a side view showing a state in which the robot cleaner of FIG. 1 is driving.
Figure 17:
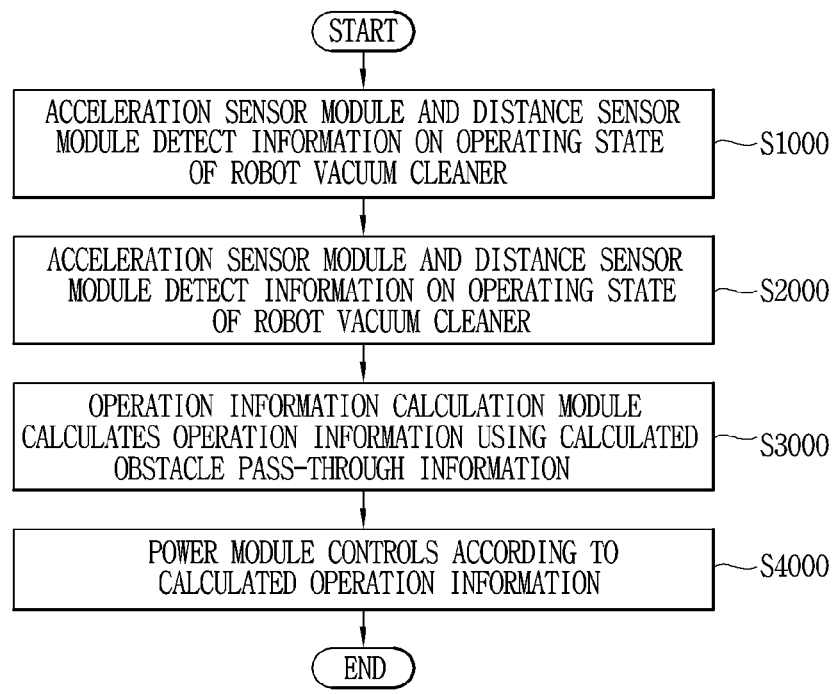
FIG. 17 is a flowchart illustrating a flow of a method for controlling a robot cleaner according to another embodiment of the present disclosure.
Figure 18:
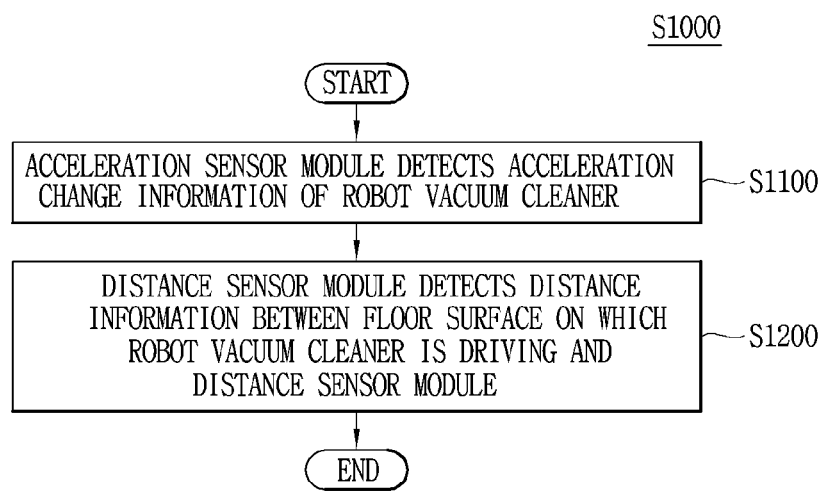
FIG. 18 is a flowchart showing a detailed flow of step S1000 in FIG. 17.
Figure 19:
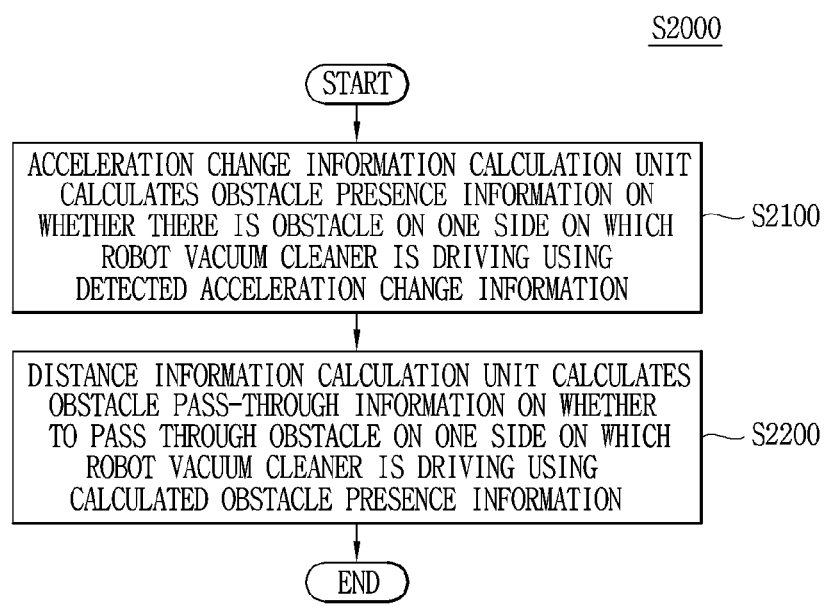
FIG. 19 is a flowchart showing a detailed flow of step S2000 in FIG. 17.
Figure 20:
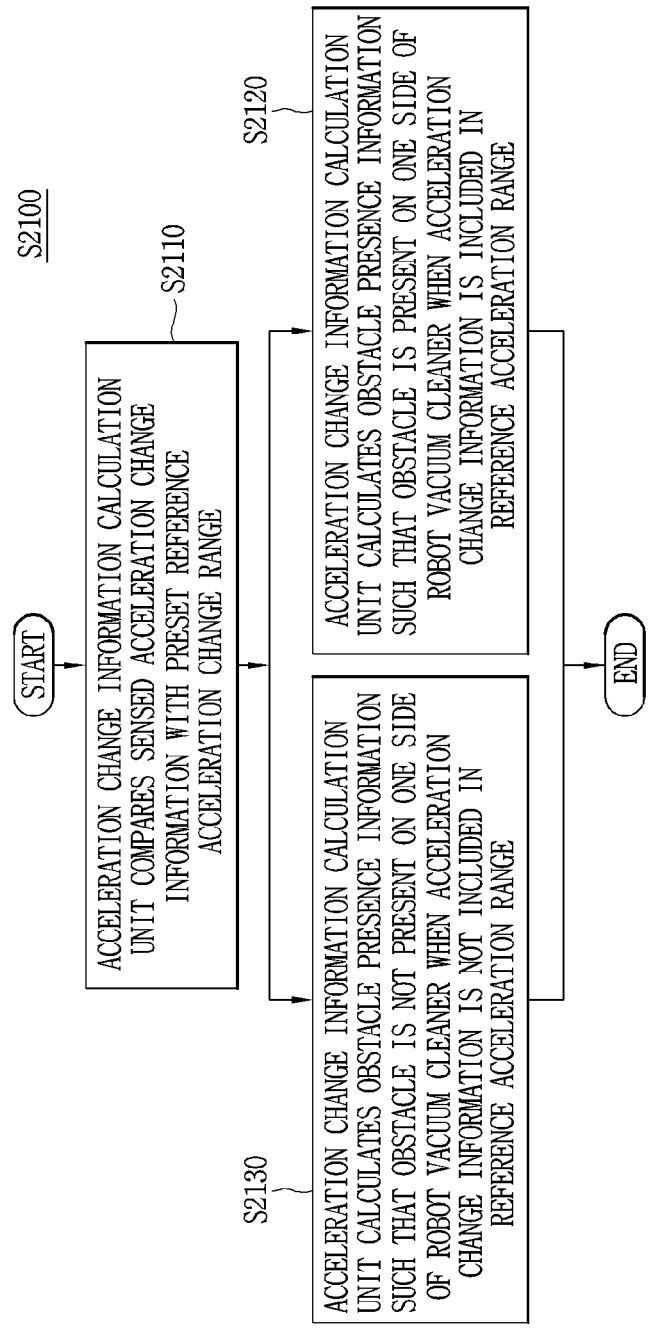
FIG. 20 is a flowchart showing a detailed flow of step S2100 in FIG. 19.
Figure 21:
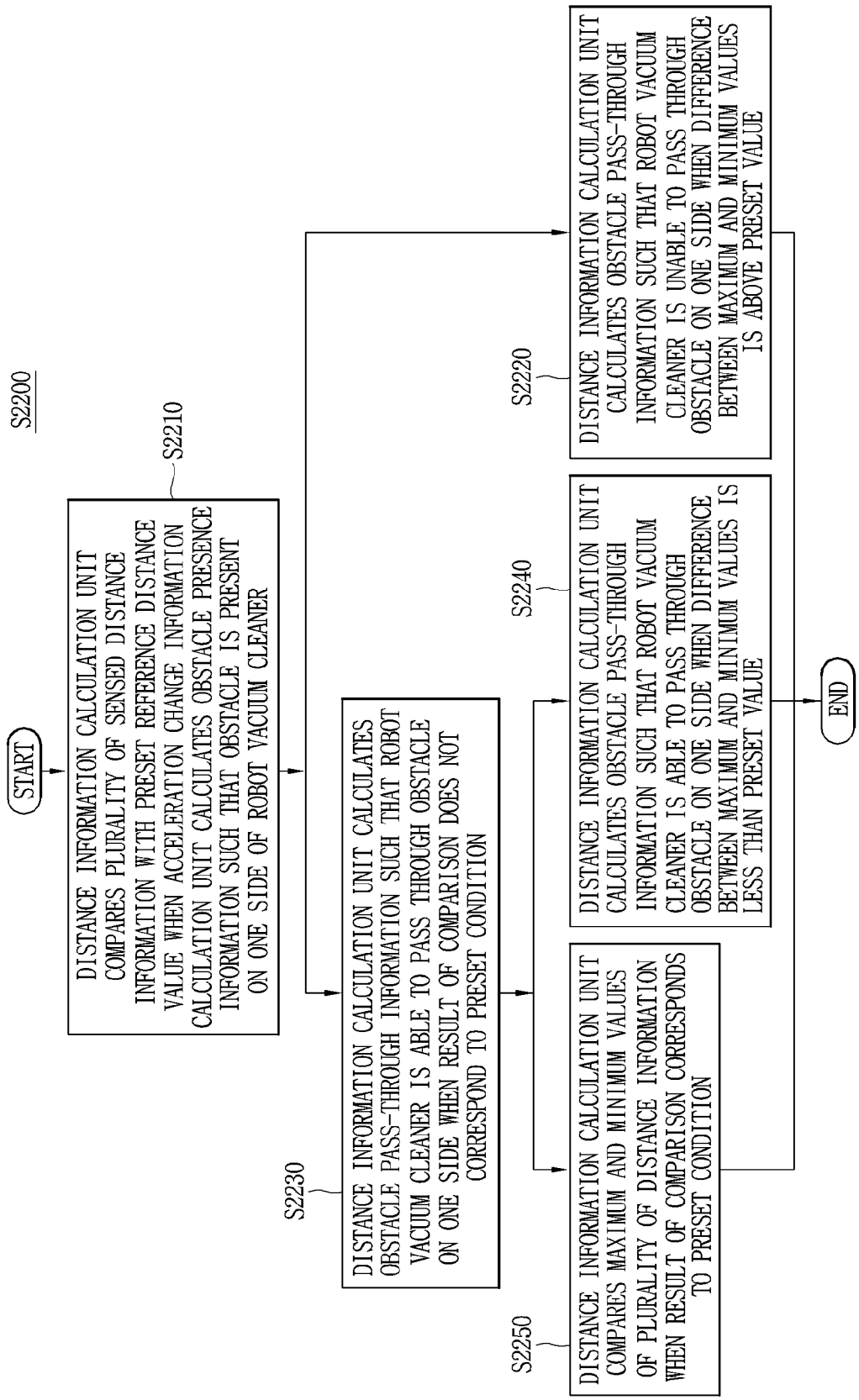
FIG. 21 is a flowchart showing a detailed flow of step S2200 in FIG. 19.
Figure 22:
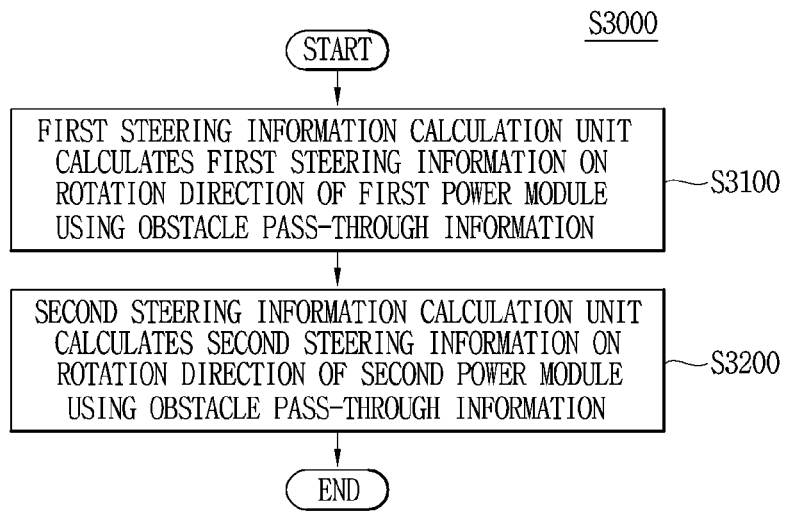
FIG. 22 is a flowchart showing a detailed flow of step S3000 in FIG. 17.
Figure 23:
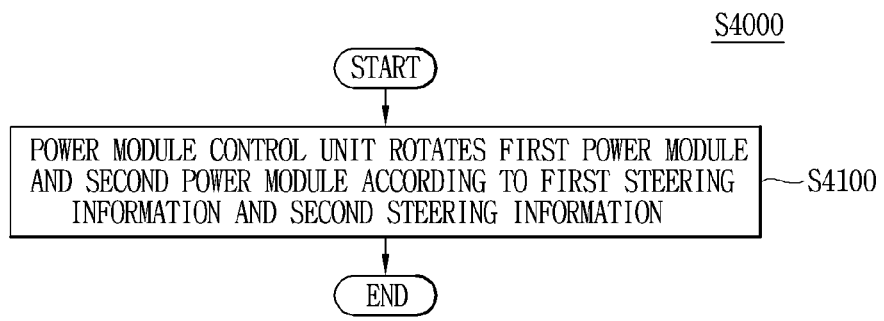
FIG. 23 is a flowchart showing a detailed flow of step S4000 in FIG. 17.

Referring to FIG. 16, the rear side of the robot cleaner 10 is over a cliff, thereby increasing a distance between the distance sensor module 230 and the floor surface than the reference distance value. When whether the robot cleaner 10 is lifted is determined only by distance information detected by the distance sensor module 230, there is a possibility that the robot cleaner 10 may be erroneously determined to be lifted from the floor surface even though it is located on a cliff.

Since whether the rear side of the robot cleaner 10 is spaced apart from the floor surface can be determined by the light amount sensor module 240 located on the rear side of the robot cleaner 10, when the robot cleaner 10 is on a cliff, the robot cleaner 10 may be suppressed from being erroneously determined to be lifted from the floor surface.

The light amount sensor module 240 is electrically connected to the detection information receiving module 340 of the controller 300. Light amount information detected by the light amount sensor module 240 may be transmitted to the light amount information receiving unit 347 and used to calculate operation information.

(3) Description of Controller 300

The controller 300 receives a control signal from a user, and calculates operation information for operating the robot cleaner 10.

Furthermore, the controller 300 may receive various detection information detected by the sensor part 200. To this end, the controller 300 is electrically connected to the sensor part 200.

The controller 300 may calculate operation information using the received control signal or the transmitted detection information. In addition, the controller 300 may control each configuration of the robot cleaner 10, in particular, the power module 130 according to the calculated operation information. To this end, the controller 300 is electrically connected to the power module 130.

Furthermore, the controller 300 is electrically connected to the database part 400.

The control signal input by the user, the detection information detected by the sensor part 200, and various information calculated by the controller 300 may be stored in the database part 400.

Various modules and units of the controller 300, which will be described later, may be electrically connected to each other. Accordingly, information input to any one module or unit or information calculated by any one module or unit may be transmitted to another module or unit.

In one embodiment, the controller 300 may be provided in any form capable of allowing the input, output, calculation, and the like of information. In one embodiment, the controller 300 may be provided with a microprocessor, a central processing unit (CPU), a printed circuit board (PCB), or the like.

The controller 300 is located in a predetermined space defined inside the housing 110. The controller 300 may be hermetically accommodated in the space so as not to be affected by external moisture or the like.

The controller 300 includes a control signal input module 310, an operation information calculation module 320, an operation control module 330 and a detection information receiving module 340, a lift information calculation module 350, and an obstacle pass-through information calculation module 360.

A control signal for driving the robot cleaner 10 is input to the control signal input module 310 by a user. The user may input a control signal through a terminal or the like. In one embodiment, the terminal may be provided as a smart phone or the like.

In another embodiment, the user may input a control signal through an input interface (not shown) provided in the robot cleaner 10.

In the other embodiment, the control signal input module 310 may be electrically connected to the input interface (not shown).

The control signal input to the control signal input module 310 is transmitted to the operation information calculation module 320. In addition, the control signal input to the control signal input module 310 may also be transmitted to and stored in the control signal storage module 410 of the database part 400.

The operation information calculation module 320 calculates operation information for operating the robot cleaner 10.

The operation information calculation module 320 may calculate operation information using the control signal input through the control signal input module 310, and each information calculated by the lift information calculation module 350 or the obstacle pass-through information calculation module 360.

In one embodiment, the operation information may include driving information and steering information. The driving information may be defined as operation information related to the operation or stop of the power module 130 of the robot cleaner 10. Furthermore, the steering information may be defined as operation information on each rotation direction of the first power module 131 and the second power module 132.

The operation information calculated by the operation information calculation module 320 is transmitted to the operation control module 330. In addition, the operation information calculated by the operation information calculation module 320 is transmitted to an operation information storage module 420 of the database part 400.

The operation information calculation module 320 includes a driving information calculation unit 321, a first steering information calculation unit 322, and a second steering information calculation unit 323.

The driving information calculation unit 321 calculates the driving information. The driving information calculation unit 321 may calculate driving information using a control signal input through the control signal input module 310 or each information calculated by the lift information calculation module 350.

The driving information calculated by the driving information calculation unit 321 may include information on the operation and stop of the first power module 131 and the second power module 132.

Specifically, when lift information is calculated by the lift information calculation module 350 such that the robot cleaner 10 is lifted from the floor surface, the operation of the first power module 131 and the second power module 132 may be stopped.

Furthermore, when the lift information calculation module 350 calculates that the robot cleaner 10 is not be lifted from the floor surface, the first power module 131 and the second power module 132 may be operated. In one embodiment, the first power module 131 and the second power module 132 may be operated in a direction that has been rotated before being stopped.

As described above, the first power module 131 and the second power module 132 controlled by the driving information may be operated or stopped. Accordingly, the driving information may be classified into first driving information for operating the first power module 131 and the second power module 132 and second driving information for stopping the first power module 131 and the second power module 132.

The first driving information includes control information for stopping the operation of the first power module 131 and the second power module 132.

The second driving information includes information for operating the first power module 131 and the second power module 132. In one embodiment, when the second driving information is calculated, the first power module 131 and the second power module 132 may be operated to rotate in a rotation direction before being stopped.

The driving information calculated by the driving information calculation unit 321, specifically, the first driving information and the second driving information is transmitted to the operation control module 330 and the operation information storage module 420.

The first steering information calculation unit 322 and the second steering information calculation unit 323 calculate first steering information and second steering information, respectively. The first steering information calculation unit 322 and the second steering information calculation unit 323 may calculate first steering information and second steering information, respectively, using a control signal input through the control signal input module 330 or each information calculated by the obstacle pass-through information calculation module 360.

The first steering information and the second steering information may include information on a rotation direction and a rotation speed of the first power module 131 and the second power module 132, respectively.

That is, the first steering information may include information on the rotation direction of the first power module 131, and the second steering information may include information on the rotation direction and rotation speed of the second power module 132.

In one embodiment, when the first steering information is calculated to rotate the first power module 131 counterclockwise, and the second steering information is calculated to rotate the second power module 132 clockwise, the robot cleaner 10 moves forward.

In the above embodiment, when the rotation speed of the first power module 131 is calculated as a value greater than that of the second power module 132 by the first steering information and/or the second steering information, the robot cleaner 10 may be rotated to the right.

In the above embodiment, when the rotation speed of the first power module 131 is calculated as a value smaller than the rotation speed of the second power module 132 by the first steering information and/or the second steering information, the robot cleaner 10 may be rotated to the left.

In one embodiment, when the first steering information is calculated to rotate the first power module 131 clockwise and the second steering information is calculated to rotate the second power module 132 clockwise, the robot cleaner 10 is rotated to the right.

In one embodiment, when the first steering information is calculated to rotate the first power module 131 counterclockwise, and the second steering information is calculated to rotate the second power module 132 counterclockwise, the robot cleaner 10 may be rotated to the left.

In one embodiment, when the first steering information is calculated to rotate the first power module 131 clockwise, and the second steering information is calculated to rotate the second power module 132 counterclockwise, the robot cleaner 10 may move backward.

When the obstacle pass-through information calculation module 360, which will be described later, calculates the obstacle pass-through information such that the robot cleaner 10 is able to pass through the obstacle 1 on one side, the first steering information and the second steering information may be calculated to allow the robot cleaner 10 to move forward.

When the obstacle pass-through information calculation module 360, which will be described later, calculates the obstacle pass-through information such that the robot cleaner 10 is unable to pass through the obstacle 1 on one side, the first steering information and the second steering information may be calculated to allow the robot cleaner 10 to move forward, rotate to the left or rotate to the right so as to avoid the obstacle 1.

The calculated first steering information and second steering information are transmitted to the operation control module 330 and the operation information storage module 420. According to the above-described first and second steering information, the robot cleaner 10 may move in various directions.

The operation control module 330 controls the power module 130 according to operation information calculated by the operation information calculation module 320. The operation control module 330 is electrically connected to the operation information calculation module 320.

The operation control module 330 includes a power module control unit 331.

The power module control unit 331 is configured to control the power module 130 according to the calculated operation information.

Specifically, the power module control unit 331 may control the first power module 131 and the second power module 132 according to the calculated first driving information or second driving information.

Furthermore, the power module control unit 331 may control the first power module 131 according to the calculated first steering information. The power module control unit 331 may control the second power module 132 according to the calculated second steering information.

The power module control unit 331 is electrically connected to the power module 130.

The detection information receiving module 340 is configured to receive each information detected by the sensor part 200. The detection information receiving module 340 is electrically connected to the sensor part 200.

Each information transmitted to the detection information receiving module 340 is transmitted to the lift information calculation module 350 and the obstacle pass-through information calculation module 360 and used to calculate each information. The detection information receiving module 340 is electrically connected to the lift information calculation module 350 and the obstacle pass-through information calculation module 360.

The detection information receiving module 340 is electrically connected to the database part 400.

Each information detected by the sensor part 200 may be transmitted to the database part 400 through the detection information receiving module 340.

The detection information receiving module 340 includes a first tilt information receiving unit 341, a second tilt information receiving unit 342, an acceleration change information receiving unit 343, a first distance information receiving unit 344, and a second distance information receiving unit 345, a third distance information receiving unit 346, and a light amount information receiving unit 347.

The first tilt information receiving unit 341 receives first tilt information detected by the first tilt sensor unit 211. The first tilt information receiving unit 341 is electrically connected to the first tilt sensor unit 211.

The first tilt information may be used to calculate whether the robot cleaner 10 is lifted from the floor surface.

In addition, in an embodiment of the present disclosure, the first tilt information may be transmitted to a tilt information calculation unit 351 of the lift information calculation module 350 and used to calculate lift information on whether the robot cleaner 10 is lifted from the floor surface. The first tilt information receiving unit 341 is electrically connected to the tilt information calculation unit 351.

The first tilt information received by the first tilt information receiving unit 341 is transmitted to the detection information storage module 430 of the database part 400. The first tilt information receiving unit 341 is electrically connected to the tilt information storage unit 431.

The second tilt information receiving unit 342 receives the second tilt information detected by the second tilt sensor unit 212. The second tilt information receiving unit 342 is electrically connected to the second tilt sensor unit 212.

The second tilt information may be used to calculate whether the robot cleaner 10 is lifted from the floor surface.

In addition, in an embodiment of the present disclosure, the second tilt information may be transmitted to the tilt information calculation unit 351 of the lift information calculation module 350 and used to calculate lift information on whether the robot cleaner 10 is lifted from the floor surface. The second tilt information receiving unit 342 is electrically connected to the tilt information calculation unit 351.

The second tilt information received by the second tilt information receiving unit 341 is transmitted to the detection information storage module 430 of the database part 400. The second tilt information receiving unit 341 is electrically connected to the tilt information storage unit 431.

The acceleration change information receiving unit 343 is configured to receive acceleration change information detected by the acceleration sensor module 220. The acceleration change information receiving unit 343 is electrically connected to the acceleration sensor module 220.

The acceleration change information received by the acceleration change information receiving unit 343 is utilized to calculate whether there is the obstacle 1 on one side of the robot cleaner 10.

In an embodiment of the present disclosure, the acceleration change information may be transmitted to an acceleration change information calculation unit 361 of the obstacle pass-through information calculation module 360 and utilized to calculate obstacle presence information on whether there is the obstacle 1 on one side of the robot cleaner 10. The acceleration change information receiving unit 343 is electrically connected to the acceleration change information calculation unit 361.

The first distance information receiving unit 344 is configured to receive first distance information detected by the first distance sensor unit 231. The first distance information receiving unit 344 is electrically connected to the first distance sensor unit 231.

The first distance information received by the first distance information receiving unit 344 is utilized to calculate whether the robot cleaner 10 is lifted from the floor surface.

Furthermore, the first distance information is transmitted to a first distance information calculation unit 352 of the lift information calculation module 350 and utilized to calculate whether the robot cleaner 10 is lifted from the floor surface. The first distance information receiving unit 344 is electrically connected to the first distance information calculation unit 352.

The first distance information received by the first distance information receiving unit 344 is utilized to calculate whether there is the obstacle 1 that can be passed therethrough on one side of the robot cleaner 10.

In addition, the first distance information is transmitted to a second distance information calculation unit 362 of the obstacle pass-through information calculation module 360 and utilized to calculate whether the obstacle 1 that can be passed therethrough is present on one side of the robot cleaner 10. The first distance information receiving unit 344 is electrically connected to the second distance information calculation unit 362.

The second distance information receiving unit 345 is configured to receive second distance information detected by the second distance sensor unit 232. The second distance information receiving unit 345 is electrically connected to the second distance sensor unit 232.

The second distance information received by the second distance information receiving unit 345 is utilized to calculate whether the robot cleaner 10 is lifted from the floor surface.

Furthermore, the second distance information is transmitted to the first distance information calculation unit 352 of the lift information calculation module 350 and utilized to calculate whether the robot cleaner 10 is lifted from the floor surface. The second distance information receiving unit 345 is electrically connected to the first distance information calculation unit 352.

The second distance information received by the first distance information receiving unit 345 is utilized to calculate whether there is the obstacle 1 that can be passed therethrough on one side of the robot cleaner 10.

In addition, the second distance information is transmitted to the second distance information calculation unit 362 of the obstacle pass-through information calculation module 360 and utilized to calculate whether the obstacle 1 that can be passed therethrough is present on one side of the robot cleaner 10. The second distance information receiving unit 345 is electrically connected to the second distance information calculation unit 362.

The third distance information receiving unit 346 is configured to receive third distance information detected by the third distance sensor unit 233. The third distance information receiving unit 346 is electrically connected to the third distance sensor unit 233.

The third distance information received by the third distance information receiving unit 346 is utilized to calculate whether the robot cleaner 10 is lifted from the floor surface.

Furthermore, the third distance information is transmitted to the first distance information calculation unit 352 of the lift information calculation module 350 and utilized to calculate whether the robot cleaner 10 is lifted from the floor surface. The third distance information receiving unit 345 is electrically connected to the first distance information calculation unit 352.

The third distance information received by the third distance information receiving unit 345 is utilized to calculate whether there is the obstacle 1 that can be passed therethrough on one side of the robot cleaner 10.

In addition, the second distance information is transmitted to the second distance information calculation unit 362 of the obstacle pass-through information calculation module 360 and utilized to calculate whether the obstacle 1 that can be passed therethrough is present on one side of the robot cleaner 10. The third distance information receiving unit 345 is electrically connected to the second distance information calculation unit 362.

The light amount information receiving unit 347 is configured to receive light amount information received by the light amount sensor module 240. The light amount information receiving unit 347 is electrically connected to the light amount sensor module.

The light amount information received by the light amount information receiving unit 347 is utilized to calculate whether the robot cleaner 10 is lifted from the floor surface.

In addition, the light amount information is transmitted to a light amount information calculation unit 353 of the lift information calculation module 350 and utilized to calculate whether the robot cleaner 10 is lifted from the floor surface. The light amount information receiving unit 347 is electrically connected to the light amount information calculation unit 353.

Each information received by the detection information receiving module 340 may be transmitted to and stored in the detection information storage module 430 of the database part 400. The detection information receiving module 340 is electrically connected to the detection information storage module 430.

The lift information calculation module 350 is configured to calculate lift information on whether the robot cleaner 10 is lifted from the floor surface using each information received from the detection information receiving module 340.

The lift information may be calculated such that the robot cleaner 10 is lifted from the floor surface or may be calculated such that the robot cleaner 10 is not lifted from the floor surface.

The lift information calculation module 350 is electrically connected to the detection information receiving module 340. Each information transmitted from the sensor part 200 to the detection information receiving module 340 may be transmitted to the lift information calculation module 350.

The lift information calculation module 350 is electrically connected to the database part 400. Each information calculated by the lift information calculation module 350 may be transmitted to the database part 400.

Each information calculated by the lift information calculation module 350 is transmitted to the operation information calculation module 320 and utilized to calculate operation information. The lift information calculation module 350 is electrically connected to the operation information calculation module 320.

The lift information calculation module 350 includes the tilt information calculation unit 351, the first distance information calculation unit 352, the light amount information calculation unit 353, and the first time information calculation unit 354.

The lift information may be defined as information on whether the robot cleaner 10 is lifted from the floor surface.

Furthermore, the lift information may be defined by an angle formed by the robot cleaner 10 with respect to the floor surface, a distance at which the robot cleaner 10 is spaced apart from the floor surface, and the like.

A process in which each of the information calculation units 351, 352, 353, 354 described below calculates lift information is described as an example.

The tilt information calculation unit 351 may calculate various information for calculating lift information using first tilt information and second tilt information received from the first tilt information receiving unit 341 and the second tilt information receiving unit 342.

Figure 11:
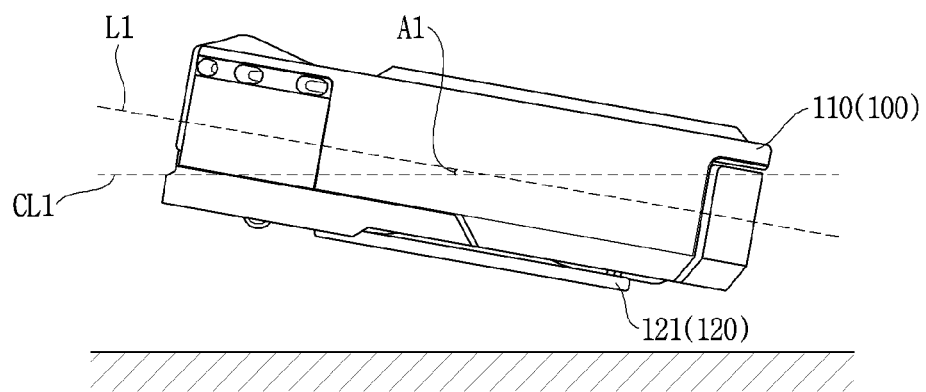
FIG. 11 is a side view showing a state in which the robot cleaner of FIG. 1 is tilted to one side.

In one embodiment, the tilt information calculation unit 351 receives the first tilt information to compare it with preset reference tilt information. The detailed description thereof will be described later. The first tilt information is information on a tilt A1 formed by the first imaginary line L1 with respect to a floor line CL1 of the floor surface (refer to FIG. 11).

Figure 12:
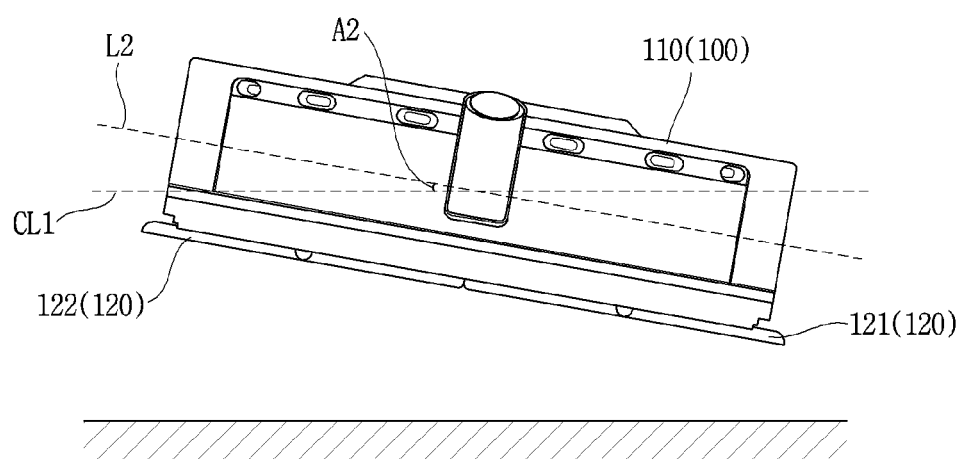
FIG. 12 is in side view showing a state in which the robot cleaner of FIG. 1 is tilted to one side.

In one embodiment, the tilt information calculation unit 351 receives the second tilt information to compare it with preset reference tilt information. The detailed description thereof will be described later. The second tilt information is information on a tilt A2 formed by the second imaginary line L2 with respect to the floor line CL1 of the floor surface (refer to FIG. 12).

The reference tilt information may be defined as a tilt to the extent that the robot cleaner 10 is unable to drive.

In addition, since the robot cleaner 10 is tilted when the user holds and lifts the robot cleaner 10 with one hand, the reference tilt information may be defined as a tilt of the robot cleaner 10 that can be generated when the user holds and lifts the robot cleaner 10 with one hand.

In one embodiment, the reference tilt information may be defined as 30 degrees.

The tilt information calculation unit 351 may compare the first tilt information and the second tilt information with the reference tilt information to calculate first temporary lift information.

When at least one of the first tilt information and the second tilt information is above the reference tilt information, the tilt information calculation unit 351 calculates the first temporary lift information.

The first temporary lift information may be defined that the robot cleaner 10 is temporarily lifted from the floor surface.

The calculated first temporary lift information is transmitted to the first time information calculation unit 354. The tilt information calculation unit 351 and the first time information calculation unit 354 are electrically connected to each other.

Furthermore, when both the first tilt information and the second tilt information are below the reference tilt information, the first distance information calculation unit 352 receives the first distance information, the second distance information, and the third distance information.

The first distance information calculation unit 352 calculates the number of distance information above a preset reference distance value from among the received distance information. The preset reference distance value may be set to a value greater than a distance that may be spaced apart due to shaking that may occur while the robot cleaner 10 is driving. In one embodiment, the reference distance value may be 10 cm.

Furthermore, the first distance information calculation unit 352 compares the number of distance information above the reference distance value with a preset reference number.

When the user holds and lifts a front side of the robot cleaner 10, some of the distance sensor units 231, 232, 233 may be covered by the user's hand. Accordingly, the preset reference number may be set in consideration of a case where the user holds and lifts the front side of the robot cleaner 10 at which the distance sensor units 231, 232, 233 are located.

In one embodiment, the preset reference number may be set to two.

When the number of distance information above the reference distance value is less than the reference number, the first distance information calculation unit 352 calculates second temporary lift information.

The second temporary lift information may be defined that the robot cleaner 10 is not to be lifted from the floor surface.

The calculated second temporary lift information is transmitted to the first time information calculation unit 354. The first distance information calculation unit 352 is electrically connected to the first time information calculation unit 354.

When the number of distance information above the reference distance is above the reference number, it may be determined that the front side of the robot cleaner 10 in which the distance sensor module 230 is located has been lifted.

Therefore, when the number of distance information above the reference distance is above the reference number, it is determined whether a rear side of the robot cleaner 10 is lifted using information on an amount of light detected from the rear side of the robot cleaner 10.

That is, when the number of distance information above the reference distance is above the reference number, the light amount information calculation unit 353 compares the light amount information received from the light amount information receiving unit 341 with a preset reference light amount value.

The preset reference light amount value may be set as a light amount value received at a distance greater than a distance that may be spaced apart due to shaking that may occur during the driving of the robot cleaner 10.

When the light amount information is below the reference light amount value, the light amount information calculation unit 353 calculates the first temporary lift information.

Furthermore, when the light amount information exceeds the reference light amount value, the light amount information calculation unit 353 calculates the second temporary lift information.

The first temporary lift information or the second temporary lift information calculated by the light amount information calculation unit 353 is transmitted to the first time information calculation unit 354. The light amount information calculation unit 353 is electrically connected with the first time information calculation unit 354.

As described above, the first distance information calculation unit 352 calculates information on whether the front side of the robot cleaner 10 is lifted from the floor surface, and the light amount information calculation unit 353 calculates information on whether the rear side of the robot cleaner 10 is lifted from the floor surface.

Accordingly, when the robot cleaner 10 is lifted at a tilt less than a reference tilt, it may be determined whether the robot cleaner 10 is lifted from the floor surface. That is, when the user lifts the robot cleaner 10 with both hands, it may be determined whether the robot cleaner 10 is lifted from the floor surface.

When the first temporary lift information is calculated by at least one of the tilt information calculation unit 351 and the light amount information calculation unit 353, the calculated first temporary lift information is transmitted to the first time information calculation unit 354.

The first time information calculation unit 354 that has received the first temporary lift information calculates a time for which the first temporary lift information lasts, and then compares the calculated time with a preset first time. In one embodiment, the first time may be 800 msec.

When the first temporary lift information lasts longer than the first time, the first time information calculation unit 354 calculates the lift information such that the robot cleaner 10 is lifted from the floor surface.

When the first temporary lift information lasts for less than the first time, the first time information calculation unit 354 calculates the lift information such that the robot cleaner 10 is not lifted from the floor surface.

Furthermore, when the second temporary lift information is calculated by at least one of the tilt information calculation unit 351, the first distance information calculation unit 352, and the light amount information calculation unit 353, the calculated second temporary lift information is transmitted to the first time calculation unit 354.

The first time information calculation unit 354 that has received the second temporary lift information calculates a time for which the second temporary lift information lasts, and then compares the calculated time with a preset second time. In one embodiment, the second time may be 500 msec.

When the second temporary lift information lasts longer than the second time, the first time information calculation unit 354 calculates the lift information such that the robot cleaner 10 is not lifted from the floor surface.

When the second temporary lift information lasts less than the second time, the first time information calculation unit 354 calculates the lift information such that the robot cleaner 10 is lifted from the floor surface.

The calculated lift information is transmitted to the operation information calculation module 320 and used to calculate operation information.

The obstacle pass-through information calculation module 360 determines whether there is the obstacle 1 on one side of the robot cleaner 10 and whether there is the obstacle 1 that can be passed therethrough using each information received from the detection information receiving module 340.

The obstacle pass-through information includes information on whether there is the obstacle 1 on one side of the robot cleaner 10 and information on whether the robot cleaner 10 is able to pass through the obstacle 1 on the one side thereof.

In one embodiment, the obstacle pass-through information may be calculated such that there is no obstacle 1 on one side of the robot cleaner 10. Furthermore, the obstacle pass-through information may be calculated such that the robot cleaner 10 is able to pass through the obstacle 1 on one side. In addition, the obstacle pass-through information may be calculated such that the robot cleaner 10 is unable to pass through the obstacle 1 on one side.

The obstacle pass-through information calculation module 360 is electrically connected to the detection information receiving module 340. Each information transmitted from the sensor part 200 to the detection information receiving module 340 may be transmitted to the obstacle pass-through information calculation module 360.

The obstacle pass-through information calculation module 360 is electrically connected to the database part 400. Each information calculated by the obstacle pass-through information calculation module 350 may be transmitted to the database part 400.

Each information calculated by the obstacle pass-through information calculation module 360 is transmitted to the operation information calculation module 320 and utilized to calculate operation information. The obstacle pass-through information calculation module 360 is electrically connected to the operation information calculation module 320.

The obstacle pass-through information calculation module 360 includes the acceleration change information calculation unit 361 and the second distance information calculation unit 362.

The obstacle pass-through information may be defined as an acceleration change of the robot cleaner 10 and a distance at which the robot cleaner 10 is spaced apart from the floor surface, and the like.

A process in which each of the information calculation units 361, 362 described below calculates lift information is described as an example.

The acceleration change information calculation unit 361 may calculate obstacle presence information using the acceleration change information received from the acceleration change information receiving unit 343. The acceleration change information calculation unit 361 is electrically connected to the acceleration change information receiving unit 343.

The obstacle presence information may be defined as information on whether the obstacle 1 is present on one side of a driving path of the robot cleaner 10.

The acceleration change information calculation unit 361 compares the received acceleration change information with a preset reference acceleration change range.

The preset reference acceleration change range may be an acceleration change range that may be generated when the robot cleaner 10 collides with the obstacle 1.

In one embodiment, the reference acceleration change range may be above a preset variance value of the first acceleration change amount and below a preset variance value of the second acceleration change amount.

When the transmitted acceleration change information is included within the reference acceleration change range, the acceleration change information calculation unit 361 calculates the obstacle presence information such that the obstacle 1 is present on one side of the robot cleaner 10.

When the transmitted acceleration change information is not included within the reference acceleration change range, the acceleration change information calculation unit 361 calculates the obstacle presence information such that the obstacle 1 is not present on one side of the robot cleaner 10.

When the obstacle presence information is calculated such that the obstacle 1 is not present on one side of the robot cleaner 10, the acceleration change information calculation unit 361 calculates the obstacle pass-through information such that the obstacle 1 is not present on one side of the robot cleaner 10.

When the obstacle presence information is calculated such that the obstacle 1 is present on one side of the robot cleaner 10, the second distance information calculation unit 362 receives each distance information from each distance information receiving unit 344, 345, 346 to calculate obstacle pass-through information.

Specifically, the first distance information, the second distance information, and the third distance information received by the second distance information calculation unit 362 are compared with a preset reference distance value.

The preset reference distance value may be a distance value between the first distance sensor unit 231, the second distance sensor unit 232, and the third distance sensor unit 233 in a stationary state and the floor surface.

When the front side of the robot cleaner 10 climbs up the obstacle 1, at least one distance information of the respective distance information becomes smaller than the reference distance value, and at least another distance information among the respective distance information becomes smaller than the reference distance value.

For example, when the front side of the robot cleaner 10 climbs up the obstacle 1, the obstacle 1 may be adjacent to the first distance sensor unit 231, and the distance D1 between the first distance sensor unit 231 and the obstacle 1 may become smaller than the reference distance value. Furthermore, the remaining second distance sensor unit 232 and the third distance sensor unit 233 are further spaced apart from the floor surface so that the distances D2, D3 between the respective sensor units 232, 233 and the obstacle 1 may become greater than the reference distance value (refer to FIG. 25). In this regard, it will be described in detail later.

In addition, for example, when a portion between the front and left sides of the robot cleaner 10 climbs up the obstacle 1, the obstacle 1 may be adjacent to the first distance sensor unit 232, and the distance D2 between the first distance sensor unit 232 and the obstacle 1 may become smaller than the reference distance value. Furthermore, the distances D1, D3 between the remaining first and third distance sensor units 231, 233 and the obstacle 1 may become greater than the reference distance value (refer to FIG. 26). In this regard, it will be described in detail later.

When a result of comparing the first distance information, the second distance information, and the third distance information with the preset reference distance value does not correspond to a preset condition, the second distance information calculation unit 362 calculates the obstacle pass-through information such that the robot cleaner is able to pass through the obstacle 1 on one side.

The preset condition may be a condition in which at least one of the respective distance information is greater than the reference distance value and at least another one of the respective distance information is smaller than the reference distance value.

When a result of comparing the first distance information, the second distance information, and the third distance information with the preset reference distance value corresponds to the preset condition, the second distance information calculation unit 362 compares the maximum value and the minimum value of the respective distance information.

When a difference between the maximum value and the minimum value is less than a preset value, the second distance information calculation unit 362 calculates the obstacle pass-through information such that the robot cleaner 10 is able to pass through the obstacle 1 on one side.

In one embodiment, the preset value may be 5 mm.

When a difference between the maximum value and the minimum value is above a preset value, the second distance information calculation unit 362 calculates the obstacle pass-through information such that the robot cleaner 10 is unable to pass through the obstacle 1 on one side.

Since the robot cleaner 10 is moved by the rotation of a mop rather than a wheel, the robot cleaner 10 may shake up and down as foreign matter is introduced between the mop and the floor surface. In addition, vertical shaking may occur in the process of starting and stopping the robot cleaner 10. Accordingly, each distance information may be larger or smaller than the reference distance value.

The preset value may be set to be larger than the difference between the maximum value and the minimum value that can be generated by the vertical shaking of the robot cleaner 10, thereby suppressing the obstacle pass-through information from being erroneously determined such that the robot cleaner 10 is unable to pass through the obstacle 1 on one side by the vertical movement of the robot cleaner 10.

Furthermore, even when a value of the difference between the minimum value and the maximum value generated by the vertical shaking of the robot cleaner 10 is greater than the preset value, the obstacle pass-through information may be suppressed from being erroneously determined by the acceleration change information calculation unit 361.

Specifically, when the acceleration change information calculation unit 361 calculates the obstacle presence information such that the obstacle 1 is present on one side of the robot cleaner 10, the second distance information calculation unit 362 starts the calculation, and thus the obstacle pass-through information may be suppressed from being erroneously determined such that the robot cleaner 10 is unable to pass through the obstacle 1 on one side.

(4) Description of Database Part 400

The database part 400 stores various information related to the operation of the robot cleaner 10.

The database part 400 may be provided in any form capable of inputting, outputting, and storing information. In one embodiment, the database part 400 may be provided in the form of an SD card, a micro SD card, a USB memory, or an SSD.

The database part 400 is electrically connected to the control signal input module 310.

A control signal input to the control signal input module 310 may be transmitted to and stored in the database part 400.

The database part 400 is electrically connected to the operation information calculation module 320. Operation information calculated by the operation information calculation module 320 may be transmitted to and stored in the database part 400.

The database part 400 is electrically connected to the sensor part 200 through the detection information receiving module 340. Each detection information sensed by the sensor part 200 may be transmitted to and stored in the database part 400.

The database part 400 is electrically connected to the lift information calculation module 350 and the obstacle pass-through information calculation module 360, respectively. Each information calculated by the lift information calculation module 350 and the obstacle pass-through information calculation module 360 may be transmitted to and stored in the database part 400.

Each of the stored information may be stored by being mapped to the operating time and environment of the robot cleaner 10. That is, each information on a task performed by the robot cleaner 10 and a small area in which the task is performed by the robot cleaner 10 at a specific time point may be mapped and stored.

The stored data may be utilized as big data for the robot cleaner 10 to efficiently perform a task. Furthermore, the robot cleaner 10 may learn the stored information through artificial intelligence (AI) to enable more effective task.

The database part 400 includes a control signal storage module 410, an operation information storage module 420, a detection information storage module 430, and a calculation information storage module 440. The respective modules 410, 420, 430, 440 may be electrically connected to one another.

The control signal storage module 410 stores a control signal input to the control signal input module 310. The control signal storage module 410 is electrically connected to the control signal input module 310.

The control signal stored in the control signal storage module 410 may be stored by being mapped to environment information in which the robot cleaner 10 is operated. Accordingly, the control signal storage module 410 may classify and store control signals according to tasks desired by the user according to specific environments.

The operation information storage module 420 may store operation information according to a specific control signal. The operation information storage module 420 is electrically connected to the control signal storage module 410.

The operation information stored in the operation information storage module 420 may be stored by being mapped to environment information in which the robot cleaner 10 is operated and control signals. Accordingly, the operation information storage module 420 may classify and store operation information on a task to be performed by the robot cleaner 10 according to a specific environment and a specific control signal.

The operation information stored in the operation information storage module 420 may be utilized when the user wants to automatically perform a task. That is, when an environment or a control signal at a time when the robot cleaner 10 is operated is similar to a specific environment or a specific control signal to which the operation information is mapped, the power module 130 may be operated according to the corresponding operation information.

Information calculated by the lift information calculation module 350 and the obstacle pass-through information calculation module 360 may be transmitted to and stored in the calculation information storage module 440. The lift information calculation module 350 and the obstacle pass-through information calculation module 360 are electrically connected to the calculation information storage module 440.

The above-described detection process of the sensor part 200, the information processing and calculation process of the controller 300, and the storage process in the database part 400 may be carried out in real time. Furthermore, the respective processes may be sequentially carried out.

3. Description of Control Method of Robot Cleaner 10 According to Embodiment of Present Disclosure A control method of the robot cleaner 10 according to an embodiment of the present disclosure may efficiently control the operation of the robot cleaner 10 according to whether the robot cleaner 10 is lifted from the floor surface.

That is, when the robot cleaner 10 is lifted from the floor surface, operation information for stopping the robot cleaner 10 may be calculated. Furthermore, when the robot cleaner 10 is placed back on the floor surface, operation information for operating the robot cleaner 10 may be calculated.

The control can be achieved by the above-described configurations without separately receiving a control signal by the user.

Hereinafter, an operation method of the robot cleaner 10 according to an embodiment of the present disclosure will be described in detail with reference to FIGS. 4 through 10.

(1) Description of Step S100 of Detecting, by Sensor Part 200, Information on Operating State of Robot Cleaner 10

This is a step of detecting, by the sensor part 200, information on the operating state of the robot cleaner 10. Hereinafter, this step will be described in detail with reference to FIG. 5.

First, each of the tilt sensor modules 210, 220 detects information on a degree of tilt of the robot cleaner 10 (S110). That is, the first tilt sensor module 210 detects the first tilt information of the robot cleaner 10. The second tilt sensor module 220 detects the second tilt information of the robot cleaner 10.

The first tilt information may be a tilt A1 formed by the first imaginary line L1 of the robot cleaner 10 with respect to the floor line CL1 of the floor surface. Furthermore, the second tilt information may be a tilt A2 formed by the second imaginary line L2 of the robot cleaner 10 with respect to the floor line CL1 of the floor surface.

In one embodiment, the first imaginary line L1 and the second imaginary line L2 may cross each other. In one embodiment, the first imaginary line L1 and the second imaginary line L2 may be orthogonal to each other.

Furthermore, the distance sensor module 230 detects distance information on a distance to the floor surface (S120). In the above step, the first to third distance sensor units 231, 232, 233 may detect first to third distance information, respectively.

In addition, the light amount sensor module 230 detects light amount information on an amount of light reflected from the floor surface (S130).

The order of detecting information by the respective sensor modules 210, 220, 230, 240 may be changed. Alternatively, each of the sensor modules 210, 220, 230, 240 may detect each information at the same time or at different times.

Each information detected by each of the sensor modules 210, 220, 230, 240 is transmitted to the detection information receiving module 340.

(2) Description of Step S200 of Calculating, by Lift Information Calculation Module 350, Lift Information on Whether Robot Cleaner 10 Is Lifted from Floor Surface Using Detected Information This is a step of receiving, by the controller 300, each sensed information, and calculating lift information using the received information. Hereinafter, this step will be described in detail with reference to FIGS. 6 to 8.

First, the lift information calculation module 350 receives each detected information from the detection information receiving module 340.

The lift information calculation module 350 calculates the first temporary lift information or the second temporary lift information using at least one of the detected respective information (S210).

A process of calculating the first temporary lift information or the second temporary lift information by the lift information calculation module 350 is as follows.

First, the tilt information calculation unit 351 compares the first tilt information with a preset first reference tilt value (S211).

A process of comparing, by the tilt information calculation unit 351, the first tilt information with the preset first reference tilt value is the same as described above.

When the first tilt information is above the first reference tilt value, the tilt information calculation unit 351 calculates the first temporary lift information (S212).

On the contrary, when the first tilt information is less than the first reference tilt value, the tilt information calculation unit 351 compares the second tilt information with a preset second reference tilt value (S213).

A process of comparing, by the tilt information calculation unit 351, the second tilt information with the preset second reference tilt value is the same as described above.

When the second tilt information is above the second reference tilt value, the tilt information calculation unit 351 calculates first temporary lift information (S214).

On the contrary, when the second tilt information is less than the second reference tilt value, the first distance information calculation unit 352 compares the number of distance information above a preset reference distance value from among a plurality of distance information with a preset reference number (S215).

A process of comparing, by the first distance information calculation unit 352, the plurality of distance information with a preset reference distance value and a process of comparing the number of distance information above the reference distance value with the preset reference number are the same as described above.

When the number of distance information above the reference distance value from among the plurality of distance information is less than the reference number, the first distance information calculation unit 352 calculates second temporary lift information (S216).

On the contrary, when the number of distance information above the reference distance value among the plurality of distance information is above the reference number, the light amount information calculation unit 353 compares light amount information with a preset reference light amount value (S217).

A process of comparing, by the light amount information calculation unit 353, light amount information with a preset reference light amount value is the same as described above.

When the light amount information is below the reference light amount value, the light amount information calculation unit 353 calculates the first temporary lift information (S218).

On the contrary, when the light amount information exceeds the reference light amount value, the light amount information calculation unit 353 calculates the second temporary lift information (S219).

The lift information calculation module 350 calculates lift information in a preset method using the calculated first or second temporary lift information (S220).

A process of calculating, by the lift information calculation module 350, the lift information using a preset method is as follows.

First, when the first temporary lift information or the second temporary lift information is calculated by the tilt information calculation unit 351, the first distance information calculation unit 352 and the light amount information calculation unit 353, the first temporary lift information or the second temporary lift information is transmitted to the first time information calculation unit 354.

When the first temporary lift information is calculated, the first time information calculation unit 354 compares a time for which the first temporary lift information is maintained with a preset first time (S221).

A process of comparing, by the first time information calculation unit 354, a time for which the first temporary lift information is maintained with a preset first time is the same as described above.

When the time for which the first temporary lift information is maintained is above a first time, the first time information calculation unit 354 calculates the lift information such that the robot cleaner 10 is lifted from the floor surface (S222).

On the contrary, when the time for which the second temporary lift information is maintained is less than the second time, the first time information calculation unit 354 calculates the lift information such that the robot cleaner 10 is not lifted from the floor surface (S223).

When the second temporary lift information is calculated, the first time information calculation unit 354 compares the time for which the second temporary lift information is maintained with a preset second time (S224).

A process of comparing, by the first time information calculation unit 354, a time for which the second temporary lift information is maintained with a preset second time is the same as described above.

When the time for which the second temporary lift information is maintained is above a second time, the first time information calculation unit 354 calculates the lift information such that the robot cleaner is not lifted from the floor surface (S225).

On the contrary, when the time for which the second temporary lift information is maintained is less than the second time, the first time information calculation unit 354 calculates the lift information such that the robot cleaner 10 is lifted from the floor surface (S226).

The order of the calculation processes may be changed. In addition, the calculation process may be performed at the same time or at different times.

The lift information calculated by the lift information calculation module 350 is transmitted to the operation information calculation module 320.

(3) Description of Step S300 of Calculating, by Operation Information Calculation Module 320, Operation Information Using Calculated Lift Information This is a step of calculating, by the operation information calculation module 320, operation information for operating the power module 130 using the received lift information. Hereinafter, this step will be described in detail with reference to FIG. 9.

The operation information calculation module 320 receives lift information from the lift information calculation module 350.

Furthermore, the driving information calculation unit 321 calculates driving information in a preset method using the lift information.

Specifically, when lift information is calculated such that the robot cleaner 10 is not lifted from the floor surface, the driving information calculation unit 321 calculates driving information as driving the power module 130 using the lift information calculated such that the robot cleaner 10 is not lifted from the floor surface (S310).

In addition, when the lift information is calculated such that the robot cleaner 10 is lifted from the floor surface, the driving information calculation unit 321 calculates driving information as stopping the power module 130 using the lift information calculated such that the robot cleaner 10 is lifted from the floor surface (S320).

When the driving information is calculated as driving the power module 130, the first power module 131 and the second power module 132 may be re-driven in a rotation direction and speed prior to stopping.

Each driving information calculated by the driving information calculation unit 321 is transmitted to the operation control module 330.

(4) Description of Step S400 of Controlling Power Module 130 According to Calculated Operation Information This is a step of operating the power module 130 according to operation information calculated by the operation information calculation module 320. Hereinafter, this step will be described in detail with reference to FIG. 10.

The power module control unit 331 rotates the power module 130 according to the calculated driving information (S410).

Specifically, when the driving information is calculated as driving the power module 130, the power module control unit 331 rotates the power module 130 according to the driving information.

Furthermore, the power module control unit 331 stops the power module 130 according to the calculated driving information (S420).

Specifically, when the driving information is calculated as stopping the power module 130, the power module control unit 331 rotates the power module 130 according to the driving information.

A case in which the user lifts the robot cleaner 10 may be detected to stop the rotation of the driving module 120, thereby suppressing the user from being injured due to the driving module 120.

4. Description of Control Method of Robot Cleaner 10 According to Another Embodiment Of Present Disclosure A control method of the robot cleaner 10 according to another embodiment of the present disclosure may effectively control the operation of the robot cleaner 10 depending on whether the obstacle 1 is present on one side of a driving path of the robot cleaner 10 and whether the robot cleaner 10 is able to pass through the obstacle on one side.

That is, when the robot cleaner 10 encounters the obstacle 1 that cannot be passed thereover, operation information for the robot cleaner 10 to avoid the obstacle 1 may be calculated.

Thereby, a case where the robot cleaner 10 accidentally passes over the obstacle 1 to the extent that cannot be passed thereover may be suppressed. That is, the robot cleaner 10 may be suppressed from passing over the obstacle 1 such as a threshold and then being unable to return to an area that has been cleaned.

The control can be achieved by the above-described configurations without separately receiving a control signal by the user.

Hereinafter, an operation method of the robot cleaner 10 according to another embodiment of the present disclosure will be described in detail with reference to FIGS. 17 through 23.

(1) Description of Step S1000 of Detecting, by Acceleration Sensor Module 220 And Distance Sensor Module 230, Information on Operating State of Robot Cleaner 10A This is a step of detecting, by the sensor part 200, information on the operating state of the robot cleaner 10. Hereinafter, this step will be described in detail with reference to FIG. 18.

First, the acceleration sensor module 220 detects the acceleration change information of the robot cleaner 10 (S1100).

Furthermore, the distance sensor module 230 detects distance information between the floor surface on which the robot cleaner 10 drives and the distance sensor module 230 (S1100). In the above step, the first to third distance sensor units 231, 232, 233 may detect first to third distance information, respectively.

The order of detecting information by the respective sensor modules 220, 230 may be changed. Alternatively, each of the sensor modules 220, 230 may detect each information at the same time or at different times.

Each information detected by each of the sensor modules 220, 230 is transmitted to the detection information receiving module 340.

Specifically, the acceleration change information detected by the acceleration sensor module 220 is transmitted to the acceleration change information receiving unit 343. The distance information detected by the distance sensor module 230 is transmitted to the distance information receiving units 344, 345, 346.

(2) Description of Step S2000 of Calculating, by Obstacle Pass-through Information Calculation Module 360, Obstacle Pass-through Information on Whether Obstacle 1 That Can Be Passed therethrough Is Present in Driving Direction of Robot Cleaner 10 Using Detected Information This is a step of receiving, by the controller 300, each sensed information and calculating obstacle pass-through information using the received information. Hereinafter, this step will be described in detail with reference to FIGS. 19 to 21.

First, obstacle presence information on whether the obstacle 1 is present at one side on which the robot cleaner 10 is driving is calculated by using acceleration change information detected by the acceleration change information calculation unit 343 (S2100).

A process of calculating obstacle presence information is as follows.

First, the acceleration change information calculation unit 361 compares the detected acceleration change information with a preset reference acceleration change range (S2110).

A process of comparing the detected acceleration change information with a preset reference acceleration change range is the same as described above.

When the acceleration change information is not included in the reference acceleration change range, the acceleration change information calculation unit 361 calculates the obstacle presence information such that the obstacle 1 is not present on one side of the robot cleaner 10 (S2120).

On the contrary, when the acceleration change information is not included in the reference acceleration range, the acceleration change information calculation unit 361 calculates the obstacle presence information such that the obstacle 1 is present on one side of the robot cleaner 10 (S2130).

Through the above-described process, information on whether the obstacle 1 is present on one side of the robot cleaner 10 while driving may be calculated.

The calculated obstacle presence information is transmitted to the second distance information calculation unit 362.

The second distance information calculation unit 362 calculates obstacle pass-through information on whether the robot cleaner 10 is able to pass through the obstacle 1 on one side while driving using the transmitted obstacle presence information (S2200).

A process of calculating, by the second distance information calculation unit 362, obstacle pass-through information is as follows.

First, when the acceleration change information calculation unit 361 calculates the obstacle presence information such that the obstacle 1 is present on one side of the robot cleaner 10, a plurality of distance information detected by the second distance information calculation unit 362 are compared with a preset reference distance value (S2210).

A process of comparing the plurality of detected distance information with the preset reference distance value is the same as described above.

When a result of the comparison does not correspond to a preset condition, the second distance information calculation unit 361 calculates the obstacle pass-through information such that the robot cleaner 10 is able to pass through the obstacle 1 on one side (S2220).

In one embodiment, the preset condition may be a case where at least one of the plurality of distance information is greater than the reference distance value and at least another one of the plurality of distance information is smaller than the reference distance value.

When a result of the comparison corresponds to a preset condition, the second distance information calculation unit 362 compares the maximum value and the minimum value of the plurality of distance information (S2230).

A process of comparing the maximum and minimum values of the plurality of distance information is the same as described above.

When a difference between the maximum and minimum values is less than a preset value, the second distance information calculation unit 362 calculates the obstacle pass-through information such that the robot cleaner 10 is able to pass through the obstacle 1 on one side (S2240).

On the contrary, when a difference between the maximum and minimum value is above a preset value, the second distance information calculation unit 362 calculates the obstacle pass-through information such that the robot cleaner 10 is unable to pass through the obstacle 1 on one side.

The order of the calculation processes may be changed. In addition, the calculation process may be performed at the same time or at different times.

The obstacle pass-through information calculated by the obstacle pass-through information calculation module 360 is transmitted to the operation information calculation module 320.

(3) Description of Step S3000 of Calculating, by Operation Information Calculation Module 320, Operation Information Using Obstacle Pass-through Information This is a step of calculating, by the operation information calculation module 320, operation information for operating the power module 130 using the received obstacle pass-through information. Hereinafter, this step will be described in detail with reference to FIG. 22.

The operation information calculation module 320 receives obstacle pass-through information from the obstacle pass-through information calculation module 360.

Furthermore, the first steering information calculation unit 322 calculates first steering information for a rotation direction of the first power module 131 using the obstacle pass-through information (S3100).

In addition, the second steering information calculation unit 323 calculates second steering information for a rotation direction of the second power module 132 using the obstacle pass-through information (S3200).

When the obstacle pass-through information is calculated such that the robot cleaner 10 is unable to pass through an obstacle on one side, the first steering information calculation unit 322 and the second steering information calculation unit 323 calculate operation information such that the robot cleaner 10 rotates to the left, rotates to the right or moves backward to avoid the obstacle.

For example, when the robot cleaner 10 moves backward to avoid an obstacle, the first steering information calculation unit 322 calculates first steering information such that the first mop 121 rotates clockwise, and the second steering information calculation unit 323 calculates second steering information such that the second mop 122 rotates counter-clockwise.

The rotation directions and rotation speeds of the first and second mops 121 and 122 for the robot cleaner 10 to rotate to the left, rotate to the right, or to move backward have been described above, and a detailed description thereof will be replaced therewith.

When the obstacle pass-through information is calculated such that the robot cleaner 10 is able to pass through an obstacle on one side thereof, the first and second steering information calculation units 322, 323 calculate operation information such that the first and second power modules 131, 132 maintain the existing operation state.

The order of the calculation processes of the first steering information and the second steering information may be changed. Furthermore, the order of calculating the first steering information and the second steering information may be performed at the same time or at different times.

The first and second steering information calculated by the respective steering information calculation units 322, 323 are transmitted to the operation control module 330.

(4) Description of Step S4000 of Controlling Power Module 130 According to Calculated Operation Information This is a step of operating the power module 130 according to operation information calculated by the operation information calculation module 320. Hereinafter, this step will be described in detail with reference to FIG. 23.

The power module control unit 331 rotates the first power module 131 and the second power module 132 according to the calculated first and second steering information (S4100).

That is, the power module control unit 331 rotates the first power module 131 and the second power module 132 according to the first and second steering information calculated by the respective steering information calculation units 322, 323.

Accordingly, it may be possible to perform a cleaning task by avoiding an obstacle through which the robot cleaner 10 cannot pass.

(5) Description of Process of Detecting Whether Robot Cleaner 10 According to Embodiment of Present Disclosure Is Able to Pass Through Obstacle According to Present Embodiment, And Controlling Same Accordingly Hereinafter, a process of operating the robot cleaner 10 to perform a task according to each configuration of the robot cleaner 10 and a control method of the robot cleaner 10 described above with reference to FIGS. 24 to 29 will be described in detail.

Figure 24:
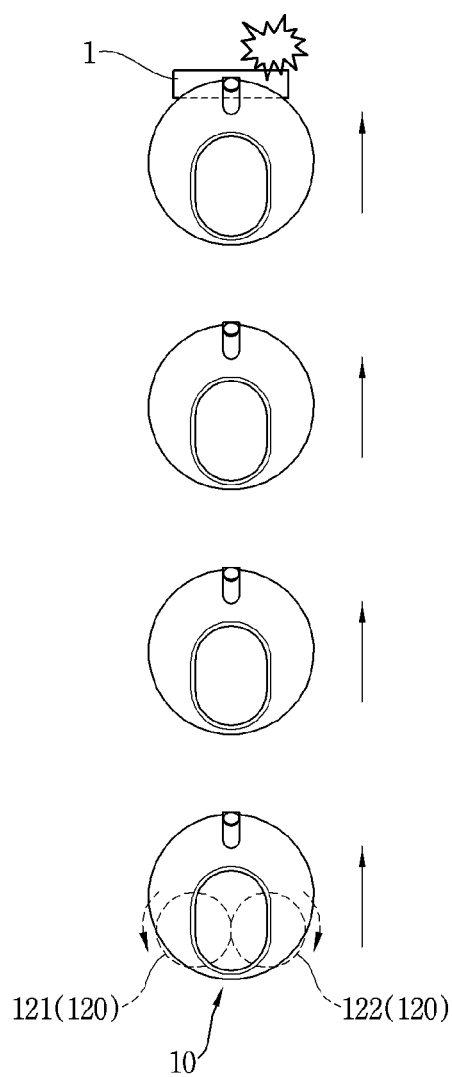
FIG. 24 is a plan view showing an example in which the robot cleaner of FIG. 1 drives.

Referring to FIG. 24, a process of performing, by the robot cleaner 10, cleaning while moving straight on the floor surface is shown. When the robot cleaner 10 moves forward, the first mop 121 rotates counterclockwise and the second mop 122 rotates clockwise.

When the obstacle 1 is present on a driving path of the robot cleaner 10, the robot cleaner 10 moves forward to collide with the obstacle 1.

Although not shown, the robot cleaner 10 may have a function of moving backward when a front side surface of the robot cleaner 10 collides with the obstacle 1.

However, when a height of the obstacle 1 is not so high enough to collide with the front side surface of the robot cleaner 10, the front side of the robot cleaner 10 may climb up the obstacle 1.

Figure 25:
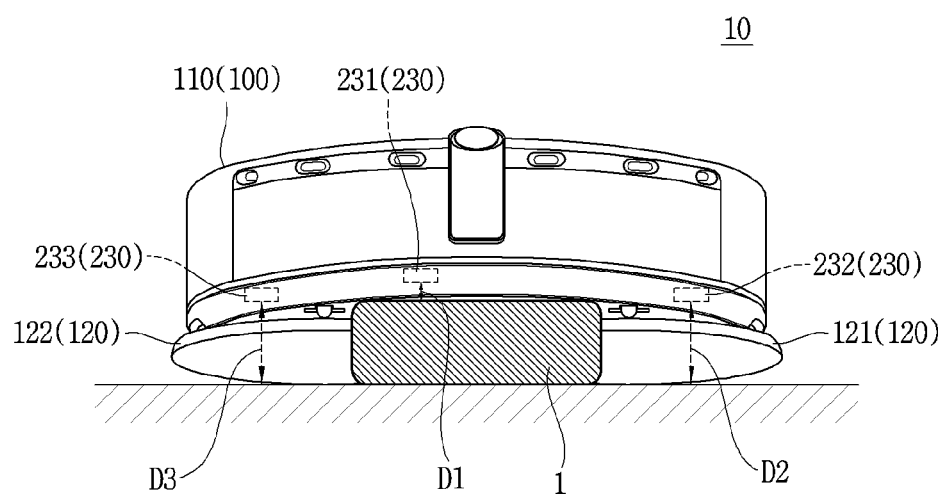
FIG. 25 is a front view showing an example in which the robot cleaner of FIG. 1 is in contact with an obstacle in the situation of FIG. 24.
Figure 26:
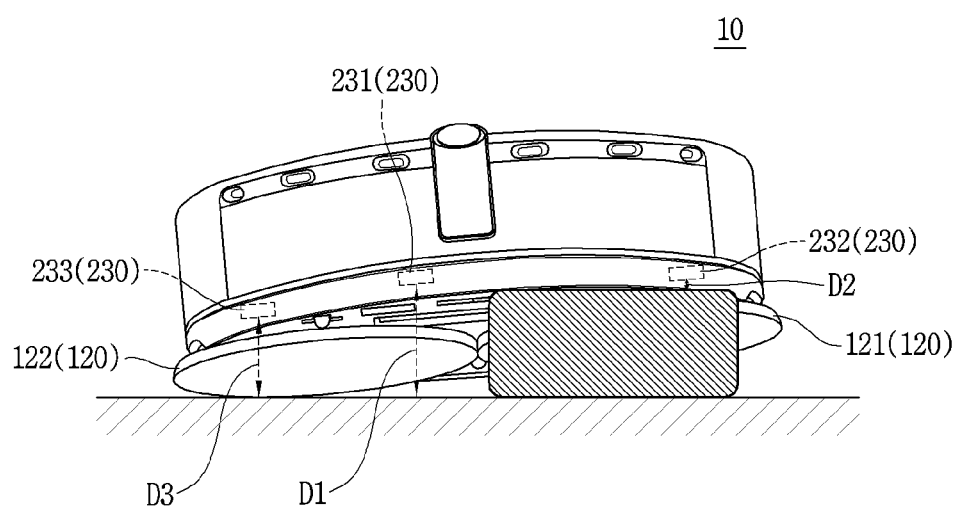
FIG. 26 is a front view showing another example in which the robot cleaner of FIG. 1 is in contact with an obstacle in the situation of FIG. 24.

Referring to FIGS. 25 and 26, the front side of the robot cleaner 10 may climb up the obstacle 1.

Here, after the robot cleaner 10 completely climbs over the obstacle 1 and leaves the cleaning area, there may be a problem in that the robot cleaner 10 is unable to return to an original cleaning area again. For example, there may be a problem in that the robot cleaner 10 climbs over the threshold to leave the cleaning area.

Furthermore, when the robot cleaner 10 climbs up a carpet to drive on the carpet, a problem of contamination of the carpet may occur.

In consideration of such a problem, as described above, whether the robot cleaner 10 is able to pass through an obstacle on one side of a driving path thereof is calculated by the obstacle pass-through information calculation module 360.

When it is calculated by the obstacle pass-through information calculation module 360 that the robot cleaner 10 is unable to pass through the obstacle on one side, the robot cleaner 10 moves backward, rotates to the left or rotates to the right to avoid the obstacle 1.

Figure 27:
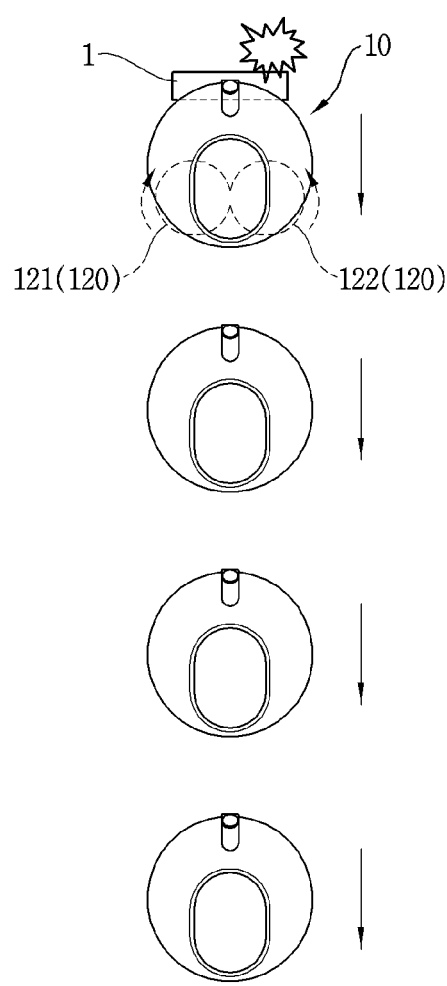
FIG. 27 is a plan view showing an example in which the robot cleaner of FIG. 1 drives in the situation of FIG. 24.

Referring to FIG. 27, a path on which the robot cleaner 10 moves backward after colliding with the obstacle 1 is shown.

The first mop 121 is controlled to rotate clockwise, and the second mop 122 is controlled to rotate counterclockwise by the power module control unit 331 that has received the first steering information and the second steering information. Thereby, the robot cleaner 10 may move backward to avoid the obstacle 1.

Figure 28:
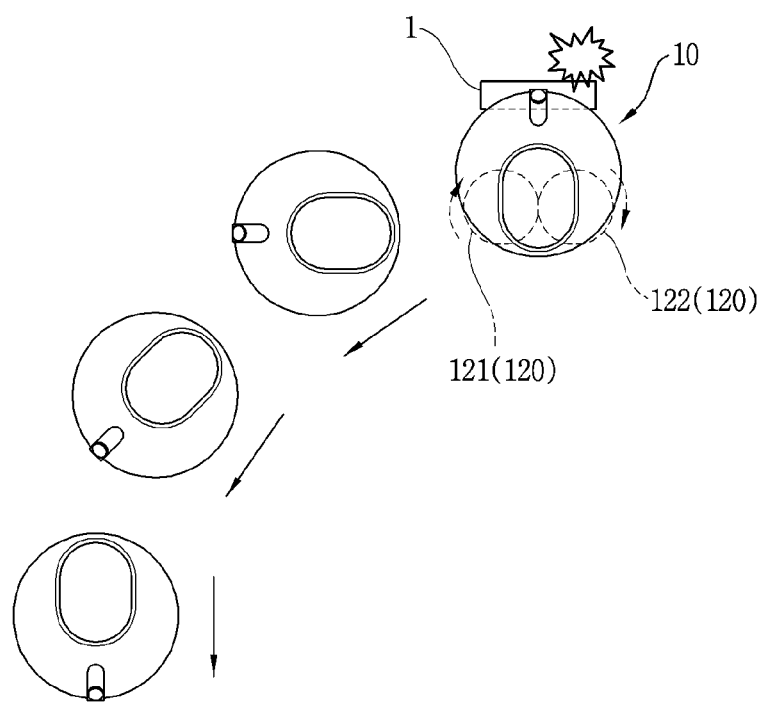
FIG. 28 is a plan view showing another example in which the robot cleaner of FIG. 1 drives in the situation of FIG. 24.

Referring to FIG. 28, a path on which the robot cleaner 10 avoids the obstacle 1 to the left after colliding with the obstacle 1 is shown.

The first and second mops 121, 122 are controlled by the power module control unit 331 that has received the first steering information and the second steering information. Accordingly, the robot cleaner 10 may be rotated to the left to avoid the obstacle 1.

In one embodiment, both the first mop 121 and the second mop 122 may be rotated clockwise. Accordingly, the robot cleaner 10 may be rotated to the left to avoid the obstacle 1.

Furthermore, in one embodiment, a rotation speed of the second mop 122 may be controlled to be greater than that of the first mop 121 while at the same time, the first mop 121 is rotated counterclockwise and the second mop 122 is rotated clockwise. Accordingly, the robot cleaner 10 may be rotated to the left to avoid the obstacle 1.

Figure 29:
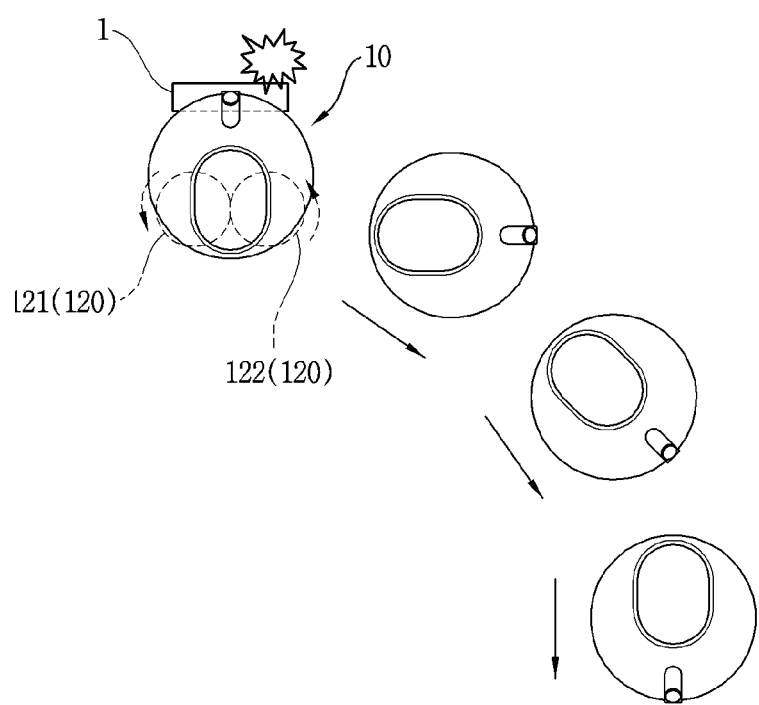
FIG. 29 is a plan view showing still another example in which the robot cleaner of FIG. 1 drives in the situation of FIG. 24.

Referring the power FIG. 29, a path on which the robot cleaner 10 avoids the obstacle 1 to the right after colliding with the obstacle 1 is shown.

The first and second mops 121, 122 are controlled by the power module control unit 331 that has received the first steering information and the second steering information. Accordingly, the robot cleaner 10 may be rotated to the right to avoid the obstacle 1.

In one embodiment, both the first mop 121 and the second mop 122 may be rotated counterclockwise. Accordingly, the robot cleaner 10 may be rotated to the right to avoid the obstacle 1.

Furthermore, in one embodiment, a rotation speed of the first mop 121 may be controlled to be greater than that of the second mop 122 while at the same time, the first mop 121 is rotated counterclockwise and the second mop 122 is rotated clockwise. Accordingly, the robot cleaner 10 may be rotated to the right to avoid the obstacle 1.

Accordingly, the robot cleaner 10 may be suppressed from leaving the cleaning area not to return again, or from contaminating a carpet or the like.

Though the present disclosure is described with reference to preferred embodiments, various modifications and improvements will become apparent to those skilled in the art without departing from the concept and scope of the present disclosure as defined in the following claims.

10: Robot cleaner
100: Body part
110: Housing
120: Driving module
121: First mop
122: Second mop
130: Power module
131: First power module
132: Second power module
200: Sensor part
210: Tilt sensor module
211: First tilt sensor unit
212: Second tilt sensor unit
220: Acceleration sensor module
230: Distance sensor module
231: First distance sensor unit
232: Second distance sensor unit
233: Third distance sensor unit
240: Light amount sensor module
300: Controller
310: Control signal input module
320: Operation information calculation module
321: Driving information calculation unit
322: First steering information calculation unit
323: Second steering information calculation unit
330: Operation control module
331: Power module control unit
340: Detection information receiving module
341: First tilt information receiving unit
342: Second tilt information receiving unit
343: Acceleration change information receiving unit
344: First distance information receiving unit
345: Second distance information receiving unit
346: Third distance information receiving unit
347: Light amount information receiving unit
350: Lift information calculation module
351: Tilt information calculation unit
352: First distance information calculation unit
353: Light amount information calculation unit
354: First time information calculation unit
400: Database part
410: Control signal storage module
420: Operation information storage module
430: Detection information storage module
431: Tilt information storage unit
432: Acceleration change information storage unit
433: Distance information storage unit
434: Light amount information storage unit
440: Calculation information storage module
441: Lift information storage unit
442: Threshold information storage unit

The invention claimed is:

1. A robot cleaner comprising: a body part to which a spin mop is rotatably coupled; a power module connected to the spin mop, and rotated according to operation information to rotate the spin mop; a sensor part provided in the body part, and configured to detect information on the driving of the body part; and a controller configured to calculate the operation information, electrically connected to the power module to transmit the calculated operation information, and electrically connected to the sensor part to receive the information on the driving of the body part, wherein the sensor part comprises: a tilt sensor module configured to detect the tilt information of the body part; a distance sensor module configured to detect distance information from a floor surface on which the body part drives; and a light amount sensor module configured to detect light amount information reflected from the floor surface, wherein the controller calculates-lift information on whether the body part is lifted from the floor surface based on at least one of the tilt information, the distance information, or the light amount information and calculates the operation information based on the lift information, wherein when the lift information is calculated such that the robot cleaner is not lifted from the floor surface, the controller calculates the operation information as driving the power module, and wherein when the lift information is calculated such that the robot cleaner is lifted from the floor surface, the controller calculates the operation information as stopping the power module.

2. The robot cleaner of The robot cleaner of wherein the distance sensor module and the light amount sensor module are provided on one side surface of the body part facing the floor surface, wherein the spin mop comprises: a first spin mop and a second spin mop spaced apart from each other on the one side surface of the body part, and wherein the distance sensor module and the light amount sensor module are disposed with an imaginary line extending through each center point of the first spin mop and the second spin mop therebetween.

3. The robot cleaner of claim 2, wherein the one side surface of the body part is defined in a circular shape.

4. The robot cleaner of claim 2, wherein the power module comprises: a first power module connected to the first spin mop; and a second power module connected to the second spin mop, and wherein the operation information comprises driving information that rotates or stops the first spin mop and the second spin mop.

5. The robot cleaner of claim 4, wherein the controller calculates the operation information using at least one of the tilt information, the distance information, or the light amount information.

6. A method of controlling a robot cleaner, the method comprising: (a) detecting, by a sensor part, information on an operating state of the robot cleaner; (b) calculating, by a lift information calculation module, lift information on whether the robot cleaner is lifted from a floor surface using the detected information; (c) calculating, by an operation information calculation module, operation information using the calculated lift information; and (d) controlling a power module according to the calculated operation information, wherein the step (c) comprises: (c1) calculating, by a driving information calculation unit, driving information as driving the power module using the lift information calculated such that the robot cleaner is not lifted from the floor surface; and (c2) calculating, by a driving information calculation unit, driving information as stopping the power module using the lift information calculated such that the robot cleaner is lifted from the floor surface, wherein the step (d) comprises: (d1) rotating, by a power module control unit, the power module according to the driving information calculated as driving the power module; and (d2), stopping, by the power module control unit, the power module according to the driving information calculated as stopping the power module.

7. The method of The method of wherein the step (a) comprises: (a1) detecting, by a tilt sensor module, first tilt information and second tilt information of the robot cleaner; (a2) detecting, by a distance sensor module, distance information on a distance to the floor surface; and (a3) detecting, by a light amount sensor module, light amount information on an amount of light reflected from the floor surface, wherein the first tilt information is information on an angle at which the robot cleaner is rotated with respect to a preset first axis, and wherein the second tilt information is information on an angle at which the robot cleaner is rotated with respect to a second axis intersecting the first axis.

8. The method of claim 7, wherein the step (b) comprises: (b11) comparing, by a tilt information calculation unit, the first tilt information with a preset first reference tilt value; and (b12) calculating, by the tilt information calculation unit, first temporary lift information when the first tilt information is above the first reference tilt value.

9. The method of claim 8, wherein subsequent to the step (b11), the step (b) comprises: (b13) comparing, by the tilt information calculation unit, the second tilt information with a preset second reference tilt value when the first tilt information is less than the first reference tilt value; and (b14) calculating, by the tilt information calculation unit, the first temporary lift information when the second tilt information is above the second reference tilt value.

10. The method of claim 9, wherein the distance sensor module is provided in plurality, and the plurality of distance sensor modules are configured to detect distance information, respectively, wherein subsequent to the step (b13), the step (b) comprises: (b15) comparing, by a distance information calculation unit, a number of the distance information above a preset reference distance value from among the plurality of distance information with a preset reference number when the second tilt information is less than the second reference tilt value; and (b16) calculating, by the distance information calculation unit, second temporary lift information when the number of the distance information above the reference distance value from among the plurality of distance information is less than the reference number.

11. The method of claim 10, wherein, subsequent to the step (b15), the step (b) comprises: (b17) comparing, by a light amount information calculation unit, the light amount information with a preset reference light amount value when the number of the distance information above the reference distance value from among the plurality of distance information is above the reference number; (b18) calculating, by the light amount information calculation unit, the first temporary lift information when the light amount information is below the reference light amount value; and (b19) calculating, by the light amount information calculation unit, the second temporary lift information when the light amount information exceeds the reference light amount value.

12. The method of claim 10, wherein the step (b) comprises: (b24) comparing, by a time information calculation unit, a time for which the second temporary lift information is maintained with a preset second time when the second temporary lift information is calculated; (b25) calculating, by the time information calculation unit, the lift information such that the robot cleaner is not lifted from the floor surface when the time for which the second temporary lift information is maintained is above the second time; and (b26) calculating, by the time information calculation unit, the lift information such that the robot cleaner is lifted from the floor surface when the time for which the second temporary lift information is maintained is less than the second time.

13. The method of claim 8, wherein the step (b) comprises: (b21) comparing, by a time information calculation unit, a time for which the first temporary lift information is maintained with a preset first time when the first temporary lift information is calculated; (b22) calculating, by the time information calculation unit, the lift information such that the robot cleaner is lifted from the floor surface when the time for which the first temporary lift information is maintained is above the first time; and (b23) calculating, by the time information calculation unit, the lift information such that the robot cleaner is not lifted from the floor surface when the time for which the first temporary lift information is maintained is less than the first time.

* * * * *